(12) United States Patent
Mellor et al.

(10) Patent No.: US 11,624,825 B2
(45) Date of Patent: Apr. 11, 2023

(54) OBJECT TRACKING

(71) Applicants: Sportlight Technology Ltd., Workington (GB); Createc Ltd, Cockermouth (GB)

(72) Inventors: Matthew Mellor, Cockermouth (GB); Shaun Prickett, Cockermouth (GB); David Clark, Cockermouth (GB)

(73) Assignees: Sportlight Technology Ltd., Workington (GB); Createc Ltd., Cockermouth (GB)

( * ) Notice: Subject to any disclaimer, the term of this patent is extended or adjusted under 35 U.S.C. 154(b) by 312 days.

(21) Appl. No.: 16/956,344

(22) PCT Filed: Dec. 21, 2018

(86) PCT No.: PCT/GB2018/053748
§ 371 (c)(1),
(2) Date: Jun. 19, 2020

(87) PCT Pub. No.: WO2019/122922
PCT Pub. Date: Jun. 27, 2019

(65) Prior Publication Data
US 2020/0333462 A1      Oct. 22, 2020

(30) Foreign Application Priority Data

Dec. 22, 2017  (GB) ..................................... 1721794

(51) Int. Cl.
*G01S 17/42*     (2006.01)
*A63B 24/00*     (2006.01)
*G01S 17/58*     (2006.01)
*G01S 17/88*     (2006.01)

(52) U.S. Cl.
CPC .......... *G01S 17/42* (2013.01); *A63B 24/0021* (2013.01); *G01S 17/58* (2013.01); *G01S 17/88* (2013.01); *A63B 2024/0025* (2013.01); *A63B 2220/05* (2013.01); *A63B 2220/805* (2013.01); *A63B 2220/806* (2013.01); *A63B 2220/807* (2013.01)

(58) Field of Classification Search
USPC .................................................. 356/4; 463/4
See application file for complete search history.

(56) References Cited

U.S. PATENT DOCUMENTS 9,234,618 B1 *   1/2016   Zhu .......................... G01S 17/08
10,905,916 B1 *  2/2021   Malik .................. A61B 5/1128
2012/0140061 A1  6/2012   Zeng
(Continued)

FOREIGN PATENT DOCUMENTS

DE      102007049147          4/2009
DE      102007049147 A1       4/2009
(Continued)

OTHER PUBLICATIONS

PCT International Search Report, Search Report issued for PCT/GB2018/053748, 4 pgs., dated Mar. 28, 2019.
Jun. 8, 2022 (GB) Examination Report—App. 1721794.4.

*Primary Examiner* — Pierre E Elisca
(74) *Attorney, Agent, or Firm* — Banner & Witcoff Ltd.

(57) ABSTRACT

Example implementations relate to tracking objects such as, for example, sport participants using a combination of LIDAR and visual camera image data.

19 Claims, 24 Drawing Sheets

(56) References Cited

U.S. PATENT DOCUMENTS

2020/0090408 A1* 3/2020 Virkar .................. G06T 7/73
2021/0127936 A1* 5/2021 Xing ................... A61L 2/10
2021/0322856 A1* 10/2021 Virkar .................. G06V 40/10

FOREIGN PATENT DOCUMENTS

| EP | 1808711 | 7/2007 |
| EP | 1808711 A2 | 7/2007 |
| EP | 1959675 | 8/2008 |
| EP | 1959675 A2 | 8/2008 |
| WO | 2005/088962 | 9/2005 |
| WO | 2005/088962 A1 | 9/2005 |
| WO | 2017/030494 A1 | 2/2017 |

* cited by examiner

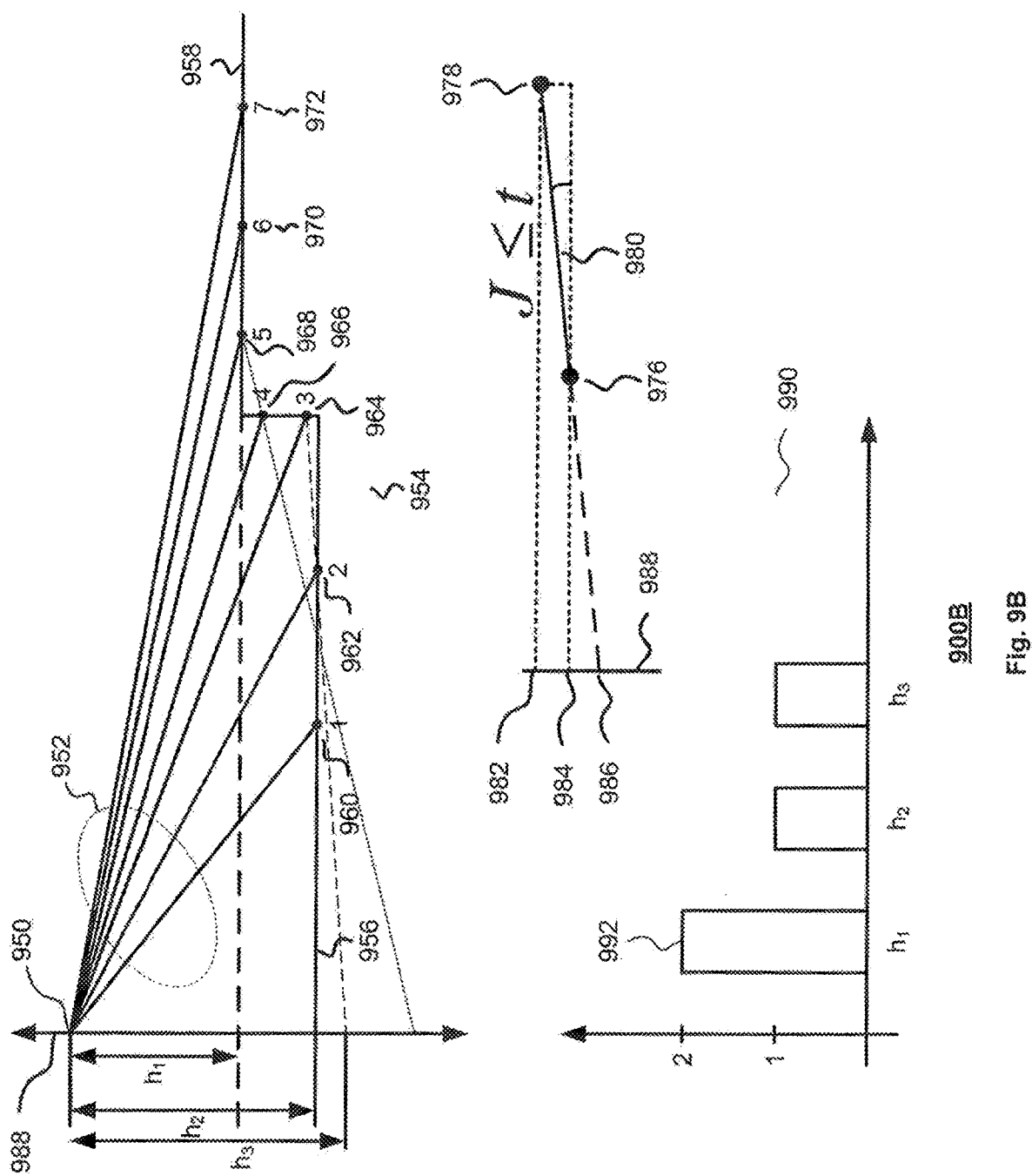

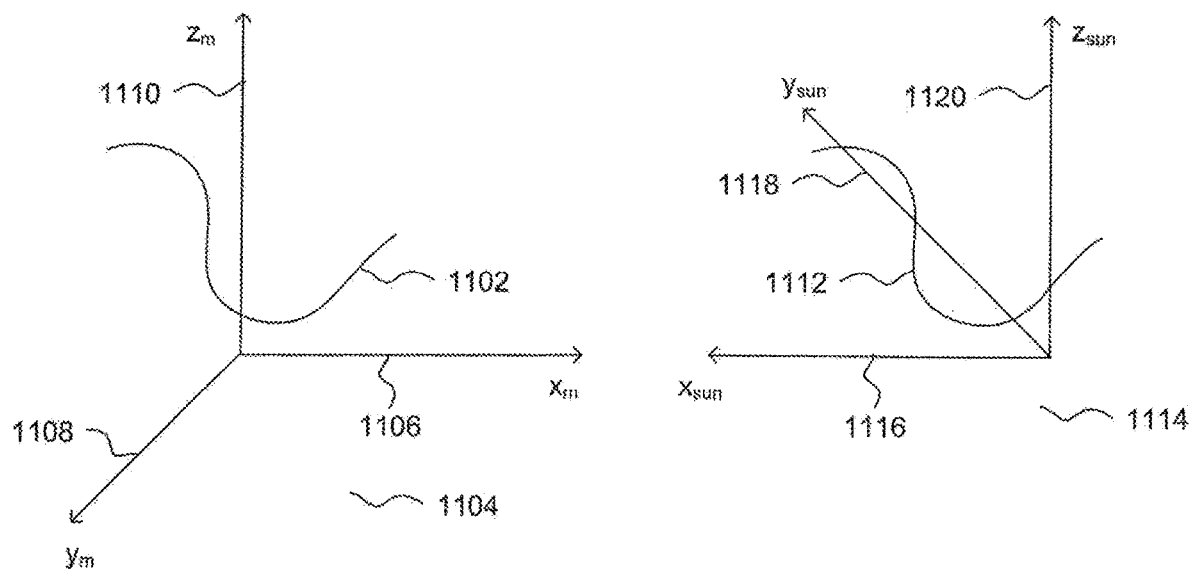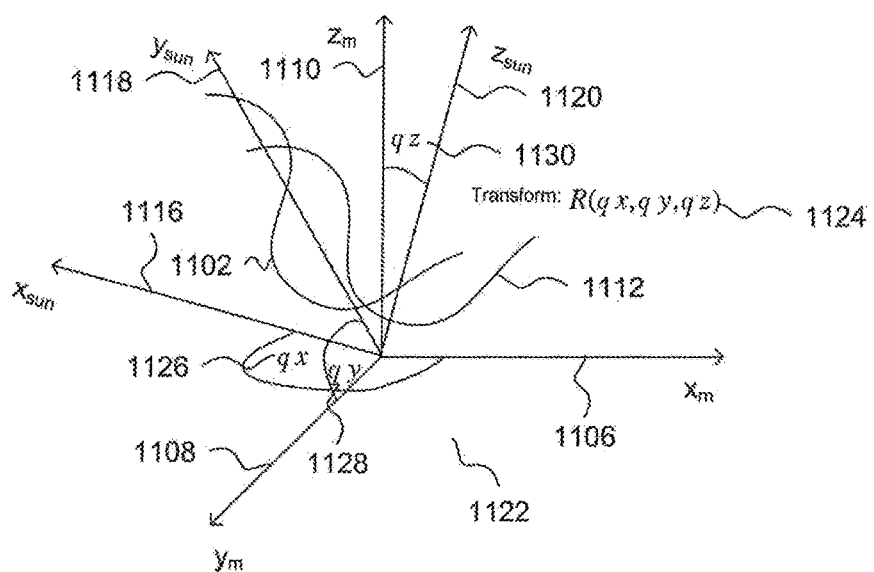
Fig. 11

1200

1200D

1600

1700

OBJECT TRACKING

There is growing interest in performance analysis of athletes. Athletes can comprise, for example, football or soccer players. Coaches are interested in gathering data relating to athletic performance to assess progress against training metrics and other athletic measurements.

Solutions to tracking athletes can comprise wearable technology that provides Global positioning system data (GPS) relating to an athlete's position in addition to accelerometer data and magnetometer data. Alternatively, non-invasive technologies attempt to track players visually. However, in both cases, there are shortcomings such as, for example, position accuracy, which is generally limited using the civilian GPS signal, or the athletes do not like wearing the wearable technology, especially during a competitive match or event.

BRIEF DESCRIPTION OF THE DRAWINGS

Various implementations are described, by way of example, referring to the accompanying drawings, in which:

FIG. 9B shows ground plane determination according to example implementations;

FIG. 11 shows a transformation between frames of reference according to example implementations;

DETAILED DESCRIPTION

Figure 1:
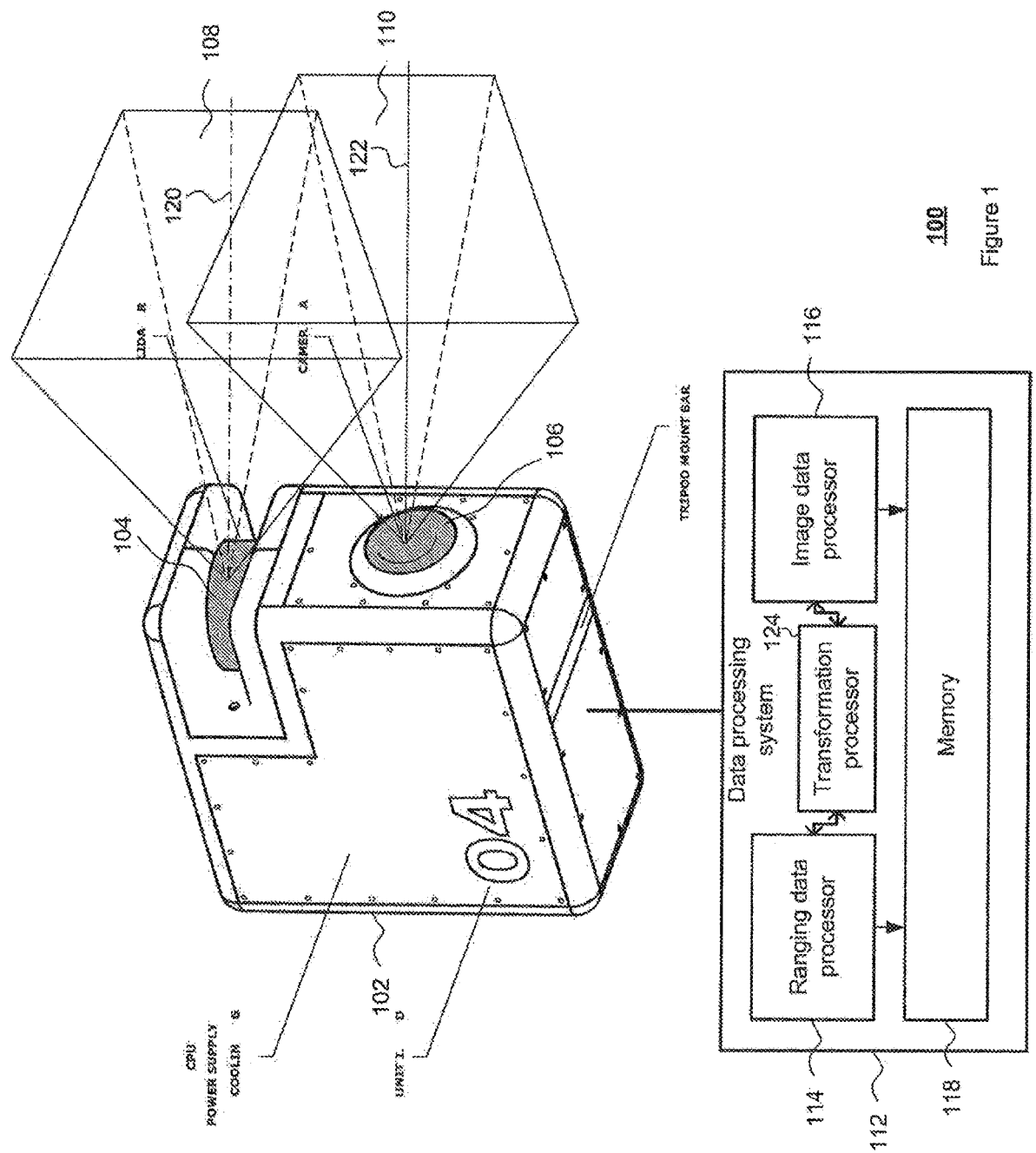
FIG. 1 shows an object tracking apparatus according to example implementations.

Referring to FIG. 1, there is shown an object tracking apparatus 100. The object tracking apparatus 100 comprises a sensor unit 102. The sensor unit 102 comprises a pair of sensors 104 and 106. One sensor 104 of the pair of sensors can comprise a ranging sensor. The ranging sensor is an example of a ranging system. The ranging sensor can be a laser-based ranging sensor that uses laser light to determine position or depth information. For example, a Light Detection and Ranging (LIDAR) system such as, for example, a PUCK VLP-16, available from, for example, Velodyne LiDAR, could be used to realise an implementation of a ranging sensor. The LIDAR system comprises a laser scanner, a high precision clock and, optionally, at least one of GPS and an inertial navigation measurement unit. The laser scanner can use a laser with a predetermined wavelength. Implementations can use a predetermined wavelength that is not visible to the human eye.

The ranging sensor 104 has an associated field of view 108. The ranging sensor 104 produces image or position/range data associated with the field of view 108 of the ranging sensor, that is, the ranging sensor provides position or range data associated with a high-resolution view of an environment. The ranging sensor 104 can produce position or range data for one or more than one scanning direction or direction of illumination of the ranging sensor. The position or range data is a measure of the location in space of, or distance to, a point or reflection or scattering of light emitted by the ranging sensor. The environment can be, for example, a scanned volume or area for hosting an event. The set of reflections or returns is known as a LIDAR image or known as ranging system data. Ranging system data is an example of range data.

The other sensor 106 of the pair of sensors 104, 106 can be a camera 106. The camera has a respective field of view 110. The camera 106 can capture at least one of video data or still image data associated with its respective field of view 110.

The fields of view 108, 110 are arranged to overlap such that they survey or cover a common volume. The ranging sensor 104 will produce range data of objects, or of the environment, within the common volume and the camera sensor will produce video or image data of objects within the common volume. The video data and still image data is known as camera data, that is, camera data produced by the camera 106 can comprise at least one, or both, of video data and still image data.

The sensor unit 102 can be coupled to a data processing system 112. The data processing system 112 can be a computer such as, for example, a laptop or other computer. The data processing system 112 can comprise a ranging data processor 114 that at least one, or both, of receives or processes data from the ranging sensor 104. The data processing system 112 can comprise an image data processor 116 that at least one, or both, of receives or processes camera data from the camera 106. Any received or processed data can be stored in memory 118. The memory can be any type of data storage such as, for example, RAM, HDD, or solid-state drive or the like for storing large data sets.

The ranging sensor 104 has a ranging sensor reference axis 120 that has a known orientation within a ranging sensor frame of reference of the ranging sensor 104. The camera 106 has a camera reference axis 122 that has a known orientation. The relative orientation and position of the ranging sensor reference axis 120 and the camera reference axis 122 are known. Knowing the relative orientation and position of the axes 120, 122 allows the ranging data and the camera data to be correlated, or be otherwise mapped into a common frame of reference by a transformation processor 124. The transformation processor 124 can form part of the data processing system 112, or some other data processing system. In general, the ranging sensor 104 and the camera 106 will have their vertical axes aligned such that the mapping between the ranging sensor frame of reference and the camera frame of reference will be a vertical displacement. The vertical displacement could be of the order of a number of centimeters or tens of centimeters.

Player specific data, or actor data, that represents at least one, or both, of ranging data or camera data associated with a player is determined from at least one, or both, of the ranging system data or camera data. The player specific data, or actor data, within the ranging system data can be processed to identify or isolate one or more than one set of data associated with a player. Additionally, or alternatively, the player specific data, or actor data, within the camera data can be processed to identify or isolate one or more than one set of data associated with a player. Still further, the player specific data, or actor data, within the ranging system data can be processed to identify or isolate one or more than one set of data associated with a player and the player specific data, or actor data, within the camera data can be processed to identify or isolate one or more than one set of data associated with the player. An overall set of player specific data can be derived from both the player specific data from the ranging system data and the player specific data from the camera data.

For example, it will be appreciated that knowing player specific data derived from the ranging system data, the corresponding camera data associated with that player can be determined. For example, changes between temporally and/or spatially separate sets of ranging system data can be used to identify ranging system data indicative of a moving person to form the player specific data. A moving person is an example of a moving object. Knowing the relative position of the player specific data within the ranging system data relative to the ranging system reference axis 120, together with knowing the transformation between the ranging system reference axis 120 and the camera reference axis 122, allows corresponding camera data, that is, player specific data comprising camera data, to be determined from the camera data.

Alternatively, or additionally, for example, knowing player specific data derived from the camera data, the corresponding ranging system data can be determined. For example, person recognition software can be used to identify visual data, that is, image or video data, from the camera data, to form the player specific data. Knowing the relative position of the player specific data within the camera data relative to the camera reference axis 122, together with knowing the transformation between the ranging system reference axis 120 and the camera reference axis 122, allows corresponding ranging system data, that is, player specific data comprising ranging data, to be determined from the ranging data.

The event can be, for example, a football match. Implementations in this specification will be described with reference to a football match with the athletes being football players. However, implementations are not limited to such an arrangement. Example implementations can be realised for tracking at least one of athletes and a ball, or other equipment, of other sports such as, for example, any of team sport like rugby, baseball, basketball, hockey, American football, volley ball, and the like or any individual sports such as, for example, tennis or golf.

Figure 2:
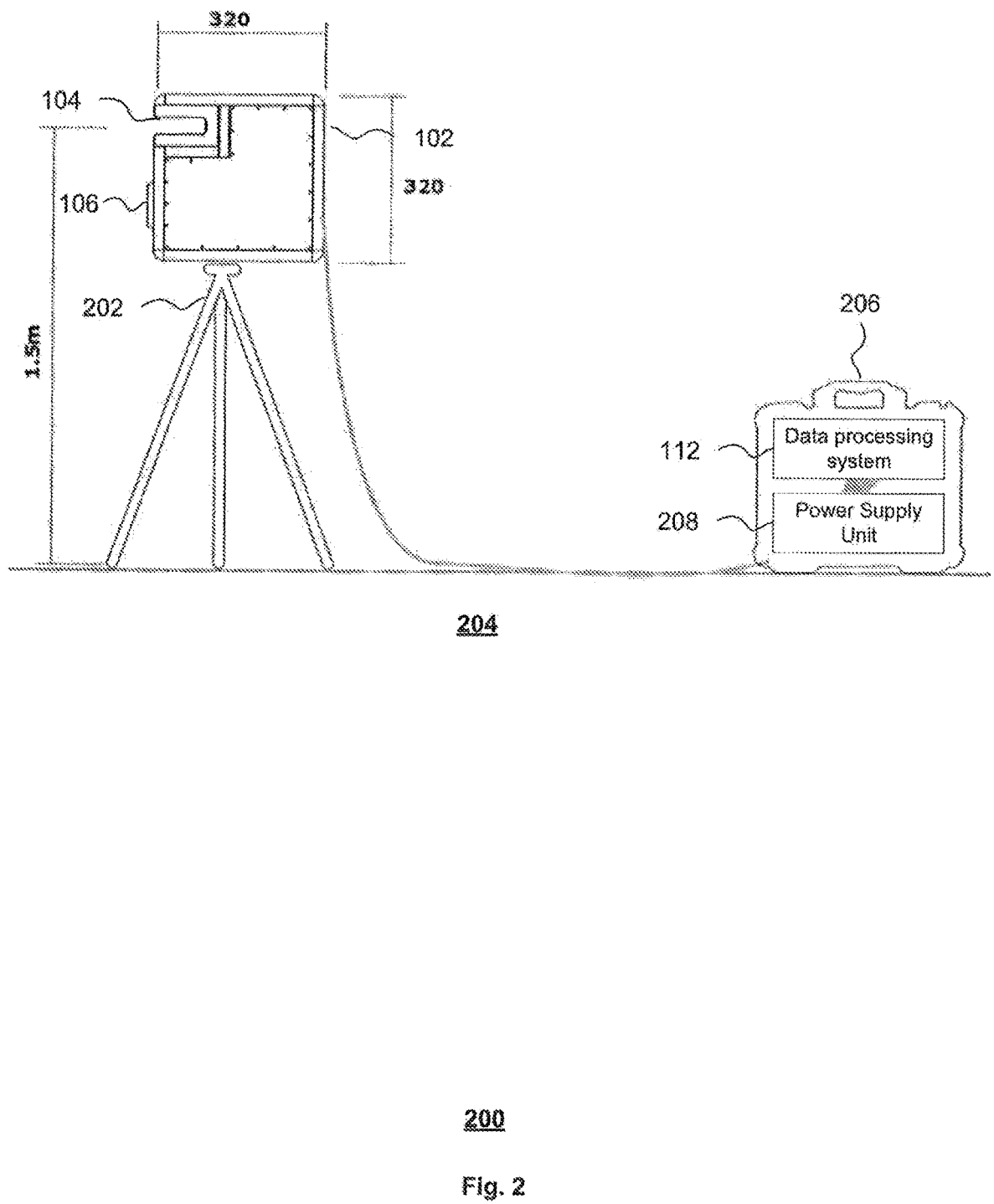
FIG. 2 depicts the object tracking apparatus with data processing system and power supply according to example implementations.

Referring to FIG. 2, there is shown a view of an object tracking system 200. The object tracking system 200 comprises the sensor unit 102, with the ranging sensor 104 and camera 106, installed on a mount 202 that elevates the sensor unit 102 above the ground 204. Also shown is a robust, portable housing 206. The housing 206 comprises at least one, or both, of the data processing system 112 or a power supply 208. The power supply 208 can supply power to at least one, or both, of the sensor unit 102 or the data processing system 112.

Figure 3:
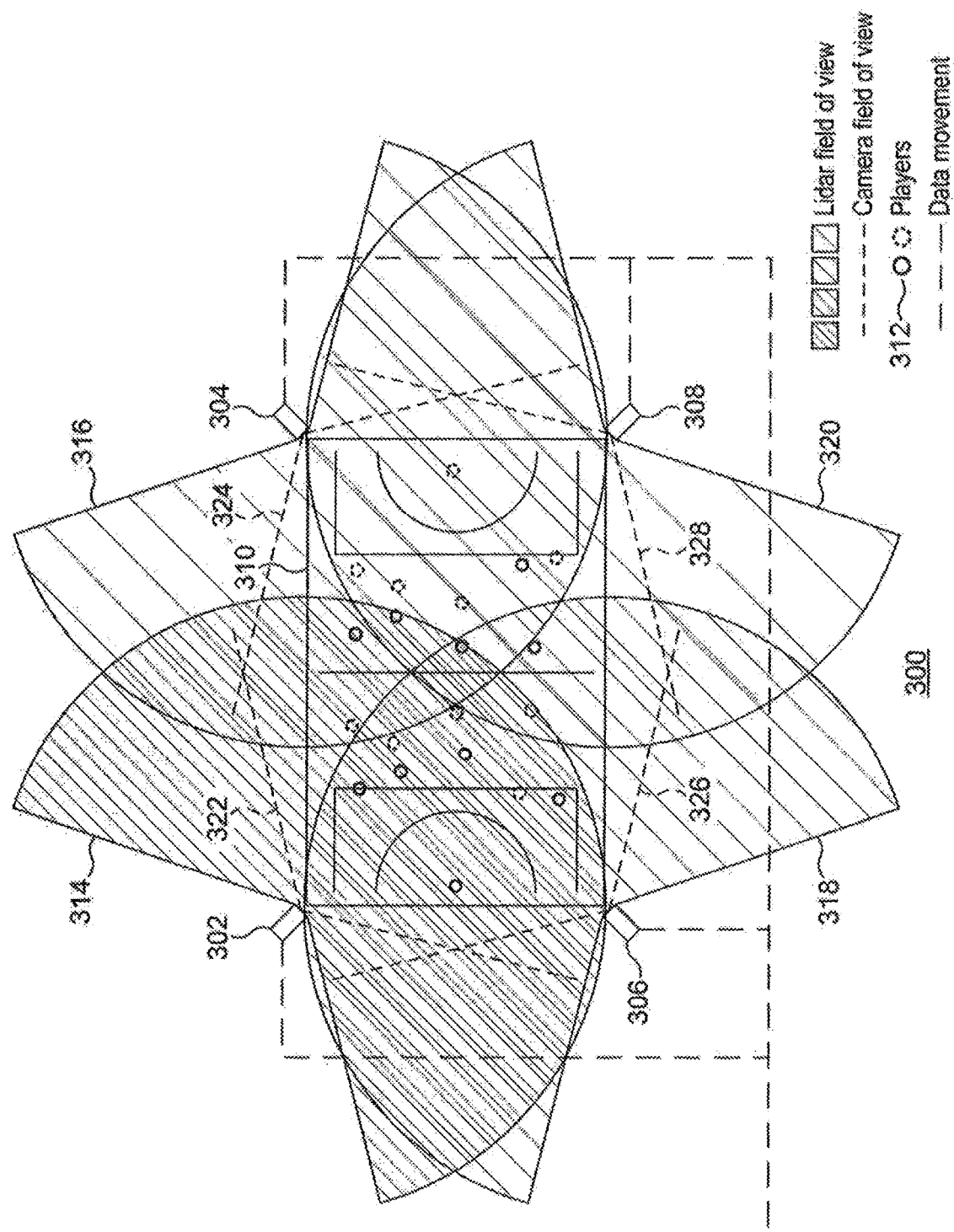
FIG. 3 illustrates an object tracking system according to example implementations.

Referring to FIG. 3, there is shown a view 300 of multiple sensor units 302 to 308 for tracking objects within a predetermined volume or area 310. Each of the multiple sensor units 302 to 308 are examples of the above described sensor unit 102. Examples will be described with reference to tracking objects, such as, for example, one or more than one of players, the ball, a referee or linesmen, taken jointly and severally in any and all permutations. The predetermined volume or area 310 is a football pitch and the objects to be tracked are moving objects within the predetermined volume or area 310 such as, for example, football players 312.

The sensor units 302 to 308 each have respective LIDAR fields of view 314 to 320. The sensor units 302 to 308 each have respective camera fields of view 322 to 328. Two or more of the LIDAR fields of view 314 to 320 may overlap. Two or more of the camera fields of view 322 to 328 may overlap. In the example implementation shown, all of the LIDAR fields of view 314 to 322 overlap and all of the camera fields of view 322 to 328 overlap.

The position of each the sensor units 302 to 308 relative to one another is known or can be determined as described below. Therefore, each sensor unit 302 to 308 has or can have associated position data. The position data of each sensor unit 302 to 208 can be relative position data that is relative to a predetermined datum or origin. Such a predetermined datum or origin can be, for example, one of the sensor units 302 to 308, such as, for example, a master sensor unit, or some other datum. Knowing the position data of one or more than one sensor unit, player or object position data can be determined using the sensor units 302 to 308. Alternatively, or additionally, the position data of the sensor units 302 to 308 can be, for example, GPS position data that provides GPS position information for a respective sensor unit. Alternatively, or additionally, at least one, or both, of the distance between or relative orientations of the sensor units could be determined by measurement. The relative heights of the sensor units 302 to 308 can be arranged to be the same, or one or more than one sensor unit can be position at an individual respective height relative to the other sensor units. Therefore, example implementations can be realised in which any or all of the sensor units 302 to 308 can be positioned at respective, different, heights, or in which one or more than one sensor unit has the same height as compared to one or more than one other sensor units, or in which one or more than one sensor unit has a different height as compared to one or more than one other sensor units.

The data processing system 112 can use the position data associated with the sensor units 302 to 308 to determine a number of metrics associated with the players 312. For example, the range measurements made by a given ranging sensor can be used to determine at least one of distance data and direction data relative to the given sensor. The distance data can, together with respective time data, be used to determine speed data. The speed data and the direction data can be used to determine velocity. The foregoing determinations can be performed by the data processing system 112, in particular, by the range data processor 114.

The data processing system 112 can associate the range data with visual or graphical data associated with a player 312. Data from multiple ranging sensors can be combined as will be described later in producing a representative curve or tracklet from multiple curves or tracklets derived from respective ranging sensors.

Figure 4:
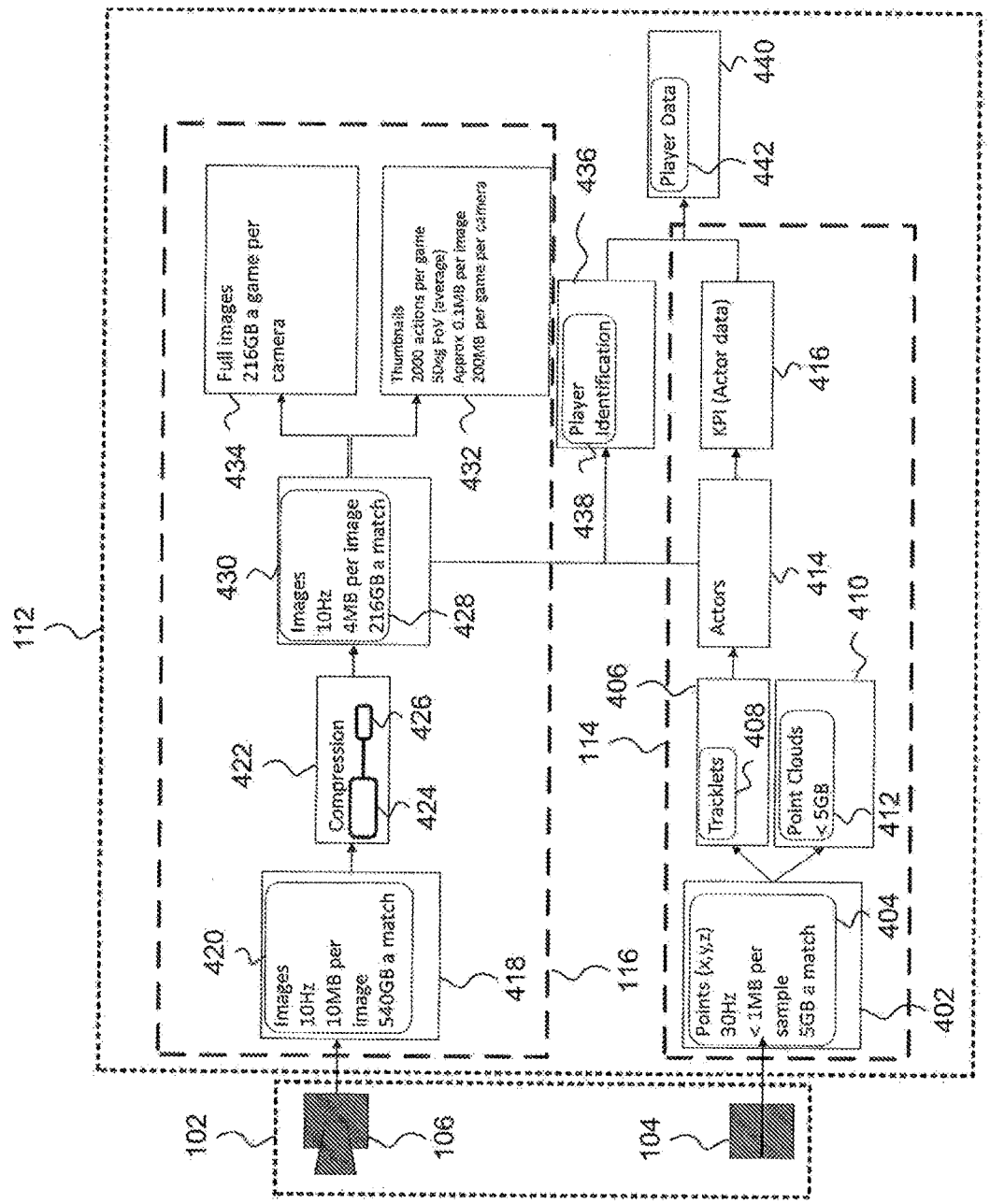
FIG. 4 shows the object tracking apparatus in more detail according to example implementations.

Referring to FIG. 4, there is shown a more detailed view 400 of the data processing system 112. The data processing system 112 is, or can be, coupled to, a sensor unit 102. The sensor unit 102 comprises the ranging sensor 104 and the camera 106.

The data processing system 112 comprises the ranging data processor 114 and the image data processor 116.

The ranging data processor 114 comprises circuitry 402 for processing ranging data 404 associated with range or distance measurements of, or within, the field of view 108 of the ranging sensor 104. The ranging data processor 114 comprises circuitry 406 for producing curves or tracklets 408. A curve or tracklet is sequence of recorded positions of a cluster representing an object that is, or has been, observed over multiple time steps. As the object moves, it's position is recorded with the corresponding time so that speed and time history can be analysed. A cluster is a group of points of a 3D cloud of points. The tracklets 408 represent a set of ranging data defining, representing, or otherwise being associated with, a path of movement of a corresponding object such as, for example, an athlete or other player.

The ranging data processor 114 comprises circuitry 410 for creating or accumulating point clouds 412. As the ranging sensor, such as, for example, a LIDAR, scans the environment, every beam returned provides a point in space, which can be a known distance from the LIDAR or 3D coordinates of the point in space. Over an entire scan, thousands of points can be determined to produce a 3D visualisation of the environment made up of points. These points, for a given ranging sensor, are known as a point cloud.

The ranging data processor 114 further comprises a tracklet processor 414. The tracklet processor 414 is arranged to process tracklets 408 to identify tracklets associated with a single, or common moving object such, for example, a common athlete or player. The tracklets can be associated with an athlete or player through automatic visual processing techniques that look, for example, to detect numbers, names, recognise a players face or through manual techniques where the images from the camera are used to identify an individual by visual inspection of the imagery.

The ranging data processor comprises still further circuitry 416 for deriving performance metrics or characteristics from or of the tracklets 408 associated with any given athlete or player. The performance metrics or characteristics can comprise at least one or more than one of position, speed, direction or velocity data identified from the tracklets. The performance metrics or characteristics are derived from the identified, or correlated, data associated with a single athlete or player, that is, a common person, using at least one of the ranging data or the camera data for that single athlete or player.

The image data processor 116 comprises a memory 418 for storing camera data, that is, at least one, or both, of still images and video data 420. Camera data is collected at a predetermined rate. Example implementations can accumulate camera data at a predetermined number of frames per second, such as, for example, at a rate of 10 Hz, that is, 10 frames per second. A frame of camera data can comprise a predetermined number of bytes. Example implementations can be realised in which a frame of camera data comprises 10 MB of data or some other amount of data. The memory 418 has a predetermined capacity. The predetermined capacity can accommodate camera data associated with a respective event or period of time. Example implementations can be realised in which the respective event or period of time is associated with, for example, a football match. Camera data 420 amounting to over 500 GB per respective event or period of time can be accumulated in the memory 418.

The image data processor 116 comprises a thumbnail processor 432 that produces thumbnail images from a set of camera data 434 output by image compression circuitry 422 that produces compressed image data 428. The compressed image data 428 can be stored in a respective memory 430. Each thumbnail image can be arranged to span $1^{st}$ and 2nd predetermined numbers of degrees vertically and horizontally, that is, in two mutually orthogonal directions. For example, each thumbnail image can be arranged to have a 5° span of the field of view both vertically and horizontally. Each thumbnail can be arranged with a fixed resolution. Each thumbnail can have differently sized thumbnail boxes determined by range.

A further memory 436 is used to store multiple sets of player identification data 438. A set of player identification data represents, or can comprise, a set of one or more than one camera data associated with the same player or athlete. Any given player or athlete may have multiple sets of player identification data.

The transformation processor 124, as indicated above, is used to correlate camera data such as, for example, the compressed image data 428, with movement data associated with a player or athlete.

A correlator 440 is used to produce player data 442. The player data 442 represents data associated with a common moving object such as, for example, a person, that is, data associated with at least one player or athlete. The player data 442 can comprise at least one or more than one of a set of player identification data 438, a set of performance metrics or characteristics taken jointly and severally or any other data associated with a given player.

Figure 5:
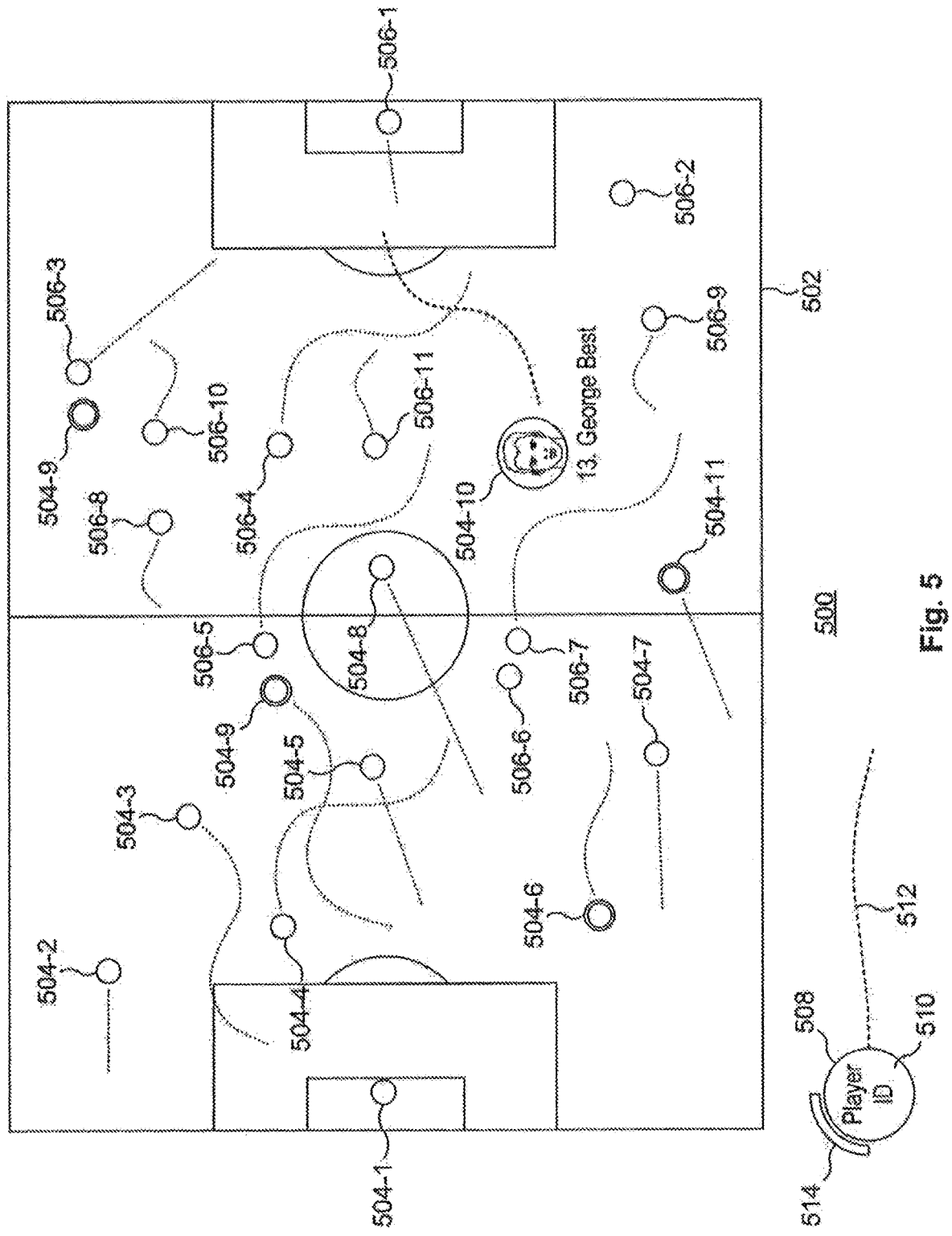
FIG. 5 shows a representation of a plurality of football players on a pitch according to example implementations.

FIG. 5 shows a view 500 of a graphical representation of the above described data. In the example implementation depicted, there is shown a view of a football field 502 together with two teams comprising respective sets of players icons 504-1 to 504-11 and 506-1 to 506-11.

One or more of the player icons comprises a respective path or tracklet showing movement over a predetermined period of time. A respective path or tracklet showing movement over a predetermined period of time is shown as dashed lines, which have not been referenced to preserve clarity. The faster the movement of a player, the longer the respective path or tracklet for a given period of time. It can be appreciated that a number of players such as, for example, 504-1, 506-2, 506-6 are stationary whereas the remaining players are moving.

FIG. 5 also shows a closer view of a player icon 508. The player icon 508 can comprise a central player ID 510 and a movement path 512. The length of the movement path 512 is indicative of distance moved by the player in a predetermined period of time. The player icon 508 also contains an indicium 514. The indicium 514 provides a visual presentation or indication of a performance metric or characteristic such as, for example, duration of play, average speed, possession of the ball or some other metric. The central player ID can be, for example, a head shot of the player of interest.

Figure 6:
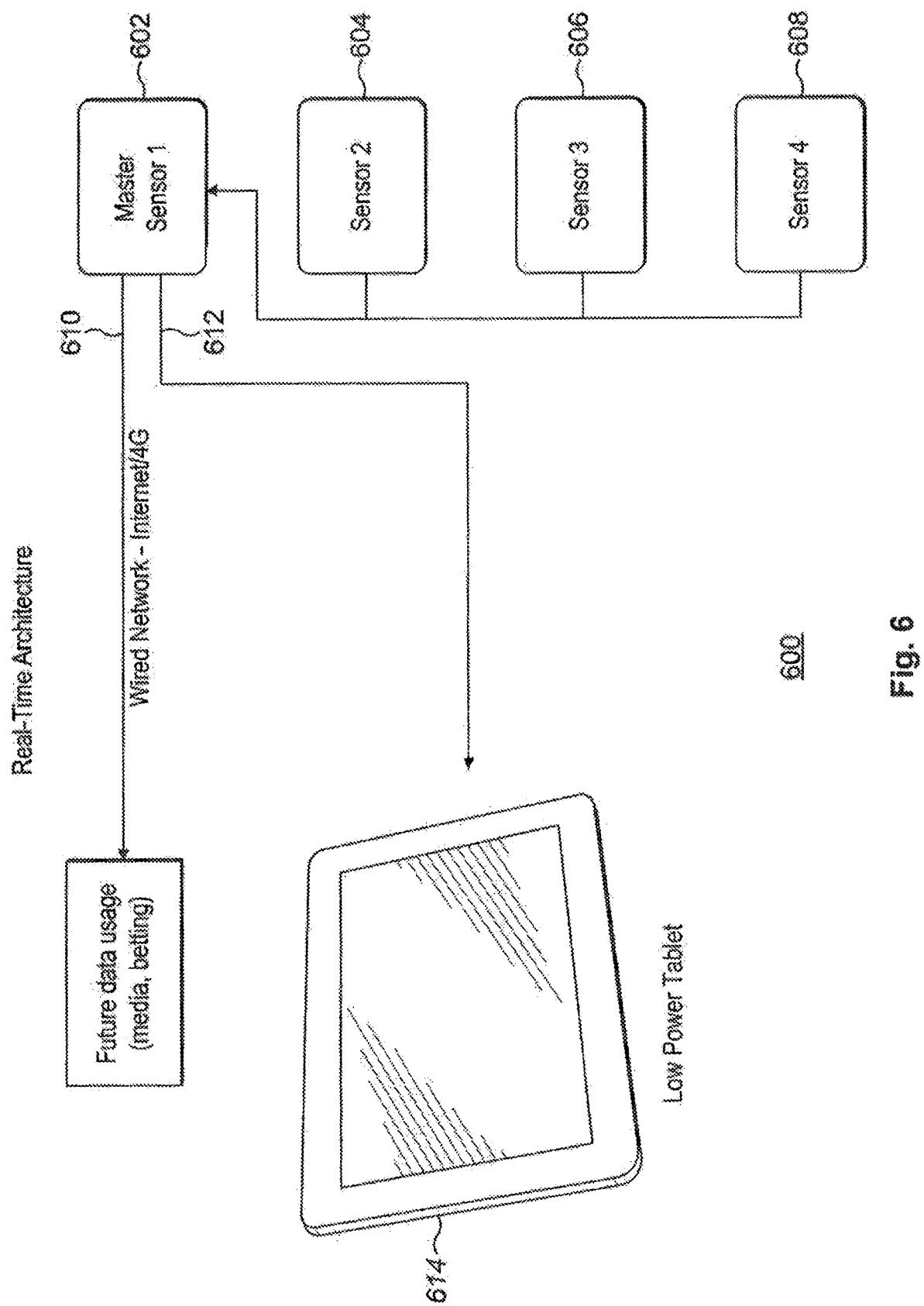
FIG. 6 illustrates a processing architecture according to example implementations.

FIG. 6 shows a view 600 of an architecture according to an implementation. The architecture comprises the master sensor unit 602 and a number of further, or slave, sensors unit 604, 606, 608. The sensor units 602 to 608 can be example implementations of the above described sensor units 302 to 308. In the example depicted, a total of four sensor units is shown. Example implementations can be realised in which some other number of sensor units are utilised. Each of the further or slave sensor units 604 to 608 are in communication with the master sensor unit 602. The master sensor unit has at least a first interface 610 for outputting data. The first interface 610 can be, for example, a wired or wireless connection. For example, the wired connection can be an Ethernet connection. The master sensor unit 602 can also have a further interface 612 for outputting data. The further interface 612 can be a wired or wireless connection. In the example depicted, the further interface is a wireless network connection. The further interface 612 can be used to supply data to a device such as, for example, a computer 614.

Figure 7:
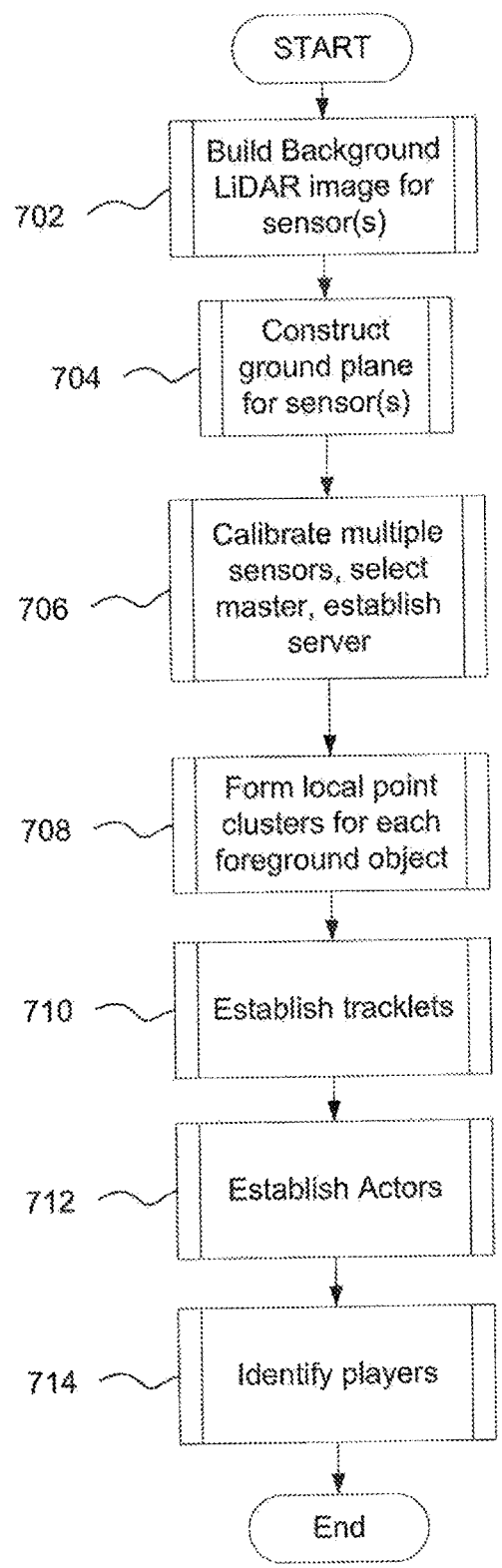
FIG. 7 depicts a flow chart according to example implementations.

FIG. 7 shows a view 700 of a flow chart according to an implementation. Each sensor unit is arranged to construct a background image at 702, in particular, the ranging sensor is used to establish a background image. The background image is a 3D point cloud of points expressed as coordinates associated with returns or reflections from the laser scanner within a predetermined frame of reference. The predetermined frame of reference can be a coordinate system. The coordinate system can be, for example, a Cartesian coordinate system, a spherical coordinate system or some other coordinate system. Therefore, example implementations can be realised in which the background image comprises a 3D point cloud of Cartesian coordinates or spherical accordance expressed with reference to a respective Cartesian frame of reference or spherical coordinate system frame of reference. The origin of each frame of reference corresponds to the focal point of the ranging sensor of a given sensor unit.

At 704, one or more than one of the sensor units establishes a ground plane for the ranging sensor from the background image. Example implementations can be realised in which all sensors establish respective ground planes. Establishing a ground plane from the background data will be described in further detail with reference to FIG. 8.

At 706, when one or more than one sensor unit has established a ground plane from respective background data, a master sensor unit is appointed. Example implementations can be realised in which the master sensor unit is the first sensor unit of the sensors units to establish a ground plane. The master sensor unit assumes the role also of a server for itself and at least one further sensor unit. Example implementations can be realised in which the master sensor unit assumes the role of a server on behalf of all other sensor units. The master sensor unit collates and outputs data derived from the other sensor units, as well as its own data.

Sensor unit calibration can also be performed at 706. At least two or more sets of points (tracklets) of the 3D point clouds for respective at least two or more sensor units are identified. The at least two or more sets of points are used to determine relationship data, that is, positional relationships, between the master sensor unit and the at least two or more sensor units. Example implementations can be realised in the relationship data comprises one or more than one rotational matrix and/or translational matrix between or mapping the master sensor unit and one or more than one sensor unit of the other sensor units. Such a rotational matrix is arranged to map one set of points of a 3D point cloud into the coordinate frame of reference of the master sensor unit, that is, a matrix establishing a mapping between one frame of reference coordinate system of a respective sensor unit to the frame of reference coordinate system of the master sensor unit. Knowing the mapping between the master frame of reference and one or more than one frame of reference of one or more than one other sensor unit, allows the relative positions of the sensor units to be determined. Example implementations can be realised in which determining the relationship data is responsive to detecting at least two or more sets of points (tracklets) of the 3D point clouds bearing respective characteristics. Examples of such respective characteristics can comprise, for example, two or more sets of points (tracklets) of the 3D point cloud having a predetermined length such as, for example, a predetermined minimum length. The predetermined length can be, for example, 20 m or some other length.

Example implementations capture the points of the 3D point clouds for each sensor unit within the local coordinate system for that sensor unit. The rotational and/or translational matrix or rotational and/or translational matrices, are used to map the point clouds or data associated with or derived from such point clouds, of the different sensor units into the coordinate frame of reference of the master sensor unit.

It can be appreciated that 702 to 706 can form or represent a calibration process for determining the relative positions of the sensor units.

Once the sensor units have been calibrated via the calibration process, the sensor units can be used for object tracking such as, for example, tracking one or more than one player of a football match. At 708, each sensor unit is arranged to identify or produce data associated with range measurements that deviate from the background image by a predetermined amount. Such range measurements that deviate from the background image by a predetermined amount are deemed to be foreground objects, that is, objects detected as moving within the field of view of the ranging sensor. Example implementations can be realised in which the predetermined amount is 20 cm. Example implementations can be realised in which the predetermined amount is at least 20 cm closer to the ranging sensor of a sensor unit. It can be appreciated that any and all example implementations described and/or claimed in this application distinguish between foreground ranging system returns and background ranging system returns such that foreground ranging system returns are dynamic, and, therefore, assumed to relate to a moving object, whereas background ranging system returns are static, and, therefore, assumed to relate to non-moving objects, that is, the background to the moving objects.

At 710, predetermined sets of points of the 3D point cloud produced by the ranging sensor of a sensor unit are determined or identified. The predetermined sets of points of the 3D point cloud produced by the ranging sensor of a sensor unit are deemed to be associated with movement of the same object. For example, movement of a football player on a football pitch, or section of the football pitch, falling within the field of view of the ranging sensor will cause, or have associated therewith, a set of points of the 3D point cloud. A given predetermined set of points of a 3D point cloud produced by the ranging sensor of a sensor unit will comprise temporarily spaced sets of points.

It will be appreciated that multiple instances of such predetermined sets of points of the 3D point clouds produced by the ranging sensors of the sensor units will be created. Furthermore, those multiple instances can be associated with the same object or associated with multiple objects.

At 712, the multiple instances of such predetermined sets of points of the 3D point clouds produced by the ranging sensors of the sensor units are processed to identify individual or respective moving objects such as, for example, individual or moving respective football players.

The individual or respective moving objects are known as actors. Having established the actors of an event, further data associated with those actors is derived from the camera data produced by the cameras of the sensor units. The point cloud data, that is, a predetermined set of points of the 3D point cloud produced by a ranging sensor of a sensor unit, is used to extract camera data associated with the predetermined set of points. The associated camera data can comprise, for example, at least one of, or both of, the video data or image data.

The video data and/or image data can be used, at 714, to access a database (not shown) of potential players with a view to identifying the player associated with the detected movement. Still further, it will be appreciated that the example implementations can advantageously identify an individual player. This is in contrast merely to detecting a moving object or a moving person, that is, identifying an individual as such as opposed to identifying a person without determining the identify of that person.

Figure 8:
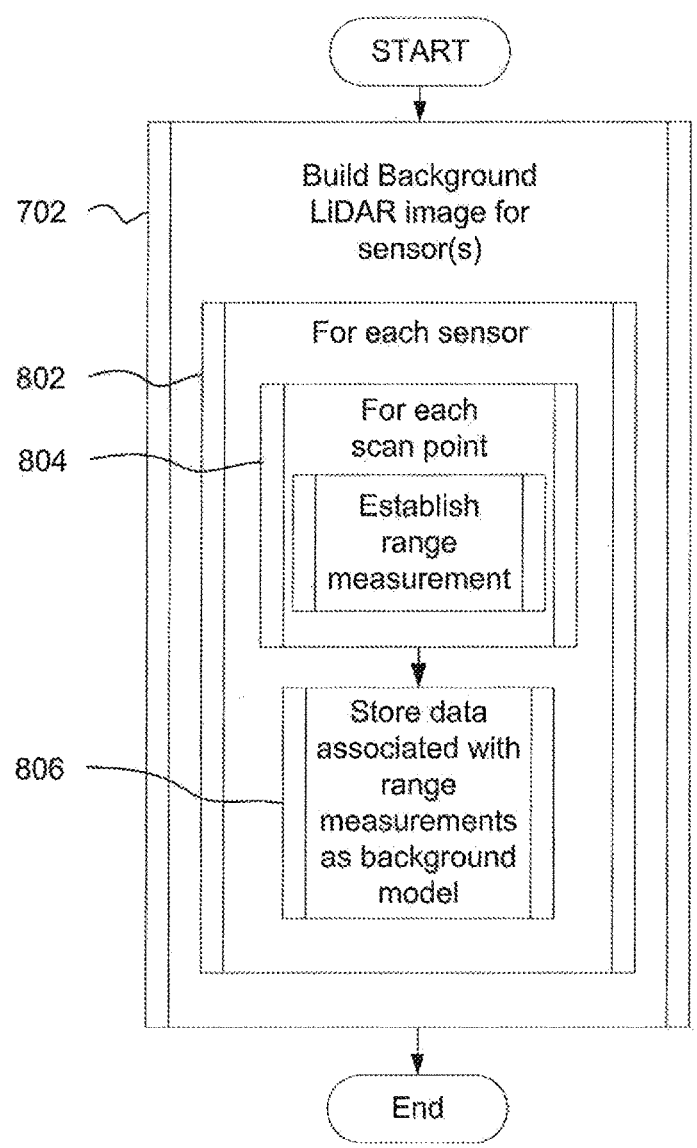
FIG. 8 shows a flow chart according to example implementations.

Referring to FIG. 8, there is shown a view of a flow chart 800 for building a background image as described above at 702. The process defined by the flow chart 800 can be implemented by each sensor unit. Background image construction is commenced for each sensor unit at 802. For each scan point of the ranging sensor, a range measurement is established at 804. Having established ranging measurements for at least a subset of possible scanning points, or all scanning points, corresponding co-ordinates in a respective co-ordinate frame of reference to form the background image are determined or stored at 806. Example implementations can store the background image as a 3D point cloud of points expressed as co-ordinates within the respective or chosen frame of reference. Therefore, an implementation can comprise storing the background image as a 3D point cloud, or set, of Cartesian co-ordinates $$\{(x_1\ y_1\ z_1)\ (x_2\ y_2\ z_2)\ \ldots\ (x_N\ y_N\ z_N)\},$$ where N is the number of scan points.

Figure 9A:
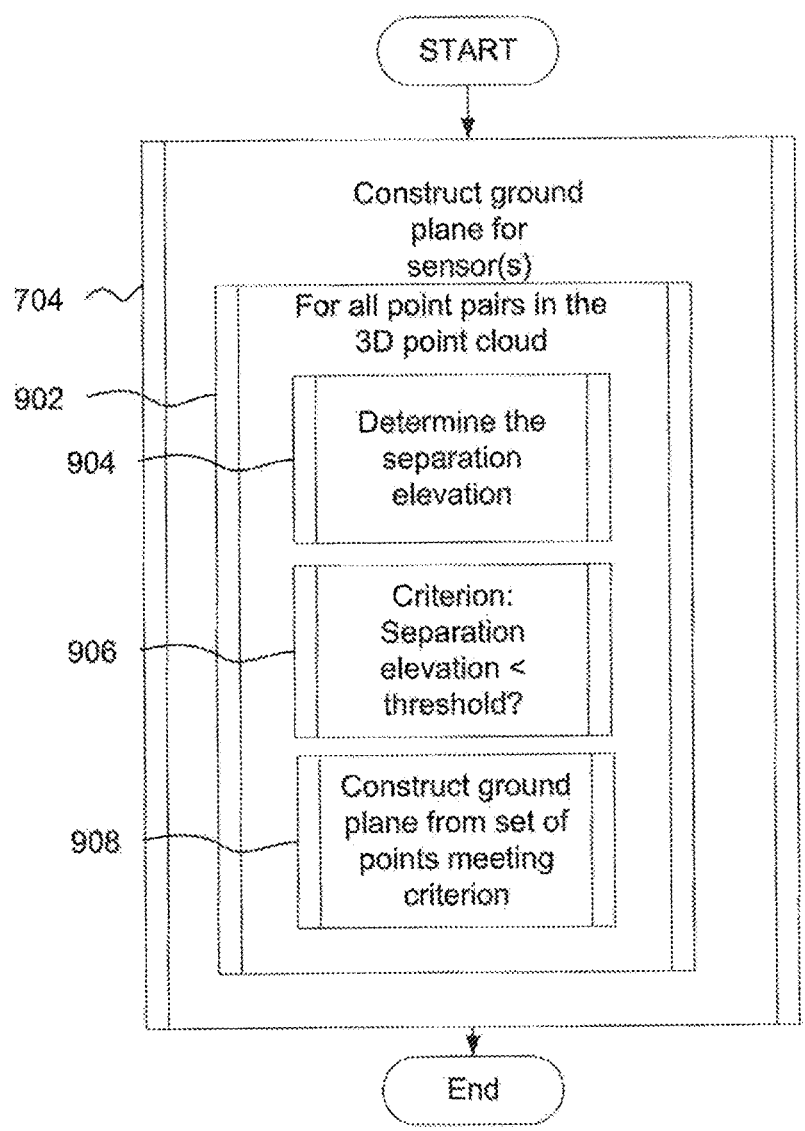
FIG. 9A illustrates a flow chart according to example implementations.

Referring to FIG. 9A, there is shown a view of a flow chart 900A for constructing a ground plane for a sensor unit as described above with reference to 704. The flow chart determines whether or not pairs of points of the 3D point cloud meet at least a criterion. At 902, a pair of points for comparison is selected. The separation in a given direction between the selected pair of points is determined at 904. Example implementations use elevation or vertical separation as the separation in a given direction. A determination is made, at 906, at regarding whether or not the separation meets at least one predetermined criterion. Example implementations can be realised in which the at least one predetermined criterion is 15 degrees. If a pair of points meets the at least one predetermined criterion, those points are, at 908, stored, or marked as, forming a candidate set of ground plane points representing a ground plane for the sensor, or representing a set of ground plane points from which a ground plane can be determined. Once a subset, or all, of the pairs of points of the 3D point cloud have been considered, the ground plane can be established from the stored candidate points. The ground plane is represented using an equation of a plane comprising a normal to the plane and a point on the plane.

Referring to FIG. 9B, there is shown a view 900B of ground plane determination according to example implementations. Assume that the focal point of the ranging sensor is at 950. Assume also that a set of vertically disposed ranging beams or LiDAR scans illuminates the ground 954 within the same vertical plane. Seven LiDAR beams are shown. Assume also that the ground 954 comprises several levels. In the example depicted, two levels 956, 958 are shown. The LiDAR beams or ranging beams are shown as intersecting the ground at respective points 960 to 974, which will produce respective returns.

The gradient, $v^C$, between adjacent sets of points of intersection with the ground is determined. For example, given two adjacent points 976, 978, the gradient, $v^C$, 980 between them is determined. If the gradient meets a respective criterion, the two points 976, 978 are considered to be candidates points within the 3D point cloud that may form part of a ground plane. Suitably, data associated with those candidate points are stored for later determining the ground plane. Example implementations can be realised in which the predetermined criterion is that the gradient, $v^C$, is less than a respective threshold. The respective threshold can be, for example, 15 degrees.

The data stored for later determining the ground plane comprises storing one or more than one height data associated with the ground plane candidate points. The one or more than one height data can be determined in several ways. For example, an implementation can store one, or both, of the heights 982, 984 associated with the candidate points in a histogram of candidate points. Alternatively, or additionally, data derived from the candidate points can be stored as part of the histogram. For example, an average height can be derived from the heights of the candidate points. Still further, example implementations can extend the line joining the candidate points to determine the point 986 of intersection with the z axis 988 of the ranging sensor respective coordinate frame of reference with the point of intersection forming the height data.

Therefore, it will be appreciated that points 960 and 962 will have a gradient that meets the criterion. The point of intersection with the z axis 988 has a height of $h_2$. Similarly, it will be appreciated that points 962 and 964 will have a gradient that meets the criterion. The point of intersection with the z axis 988 has a height of $h_3$. Adjacent points 964 and 966 will not meet the criterion. Adjacent points 966 and 968 also do not meet the criterion. It will be appreciated that points 968 and 970 will have a gradient that meets the criterion. The point of intersection with the z axis 988 has a height of $h_1$. Similarly, adjacent points 970 and 972 will meet the criterion and they have a point of intersection with the z axis at a height of $h_1$.

Therefore, referring to the histogram 990, it can be appreciated that the distribution shows a majority of candidate points 992 having a height of $h_1$ such that the respective candidate points are deemed to form the ground plane. A mathematical representation of the ground plane is derived from the candidate points. The mathematical representation can be expressed as the equation of a plane comprising a vector of a point in the plane and a normal to the plane. It will be appreciated that the foregoing has used points within a single plane for determining the ground plane. Example implementations are not limited to such an arrangement. Example implementations can be realised in which points associated with two or more vertical planes are used for determining the histogram that is used to determine ground plane.

All heights, or z-axis coordinates, output by the ranging sensor are determined with reference to the ground plane, which is deemed to be at z=0. The determined ground plane can be communicated to the other sensor units, which can also use the determined ground plane as their respective z=0 point.

Figure 10:
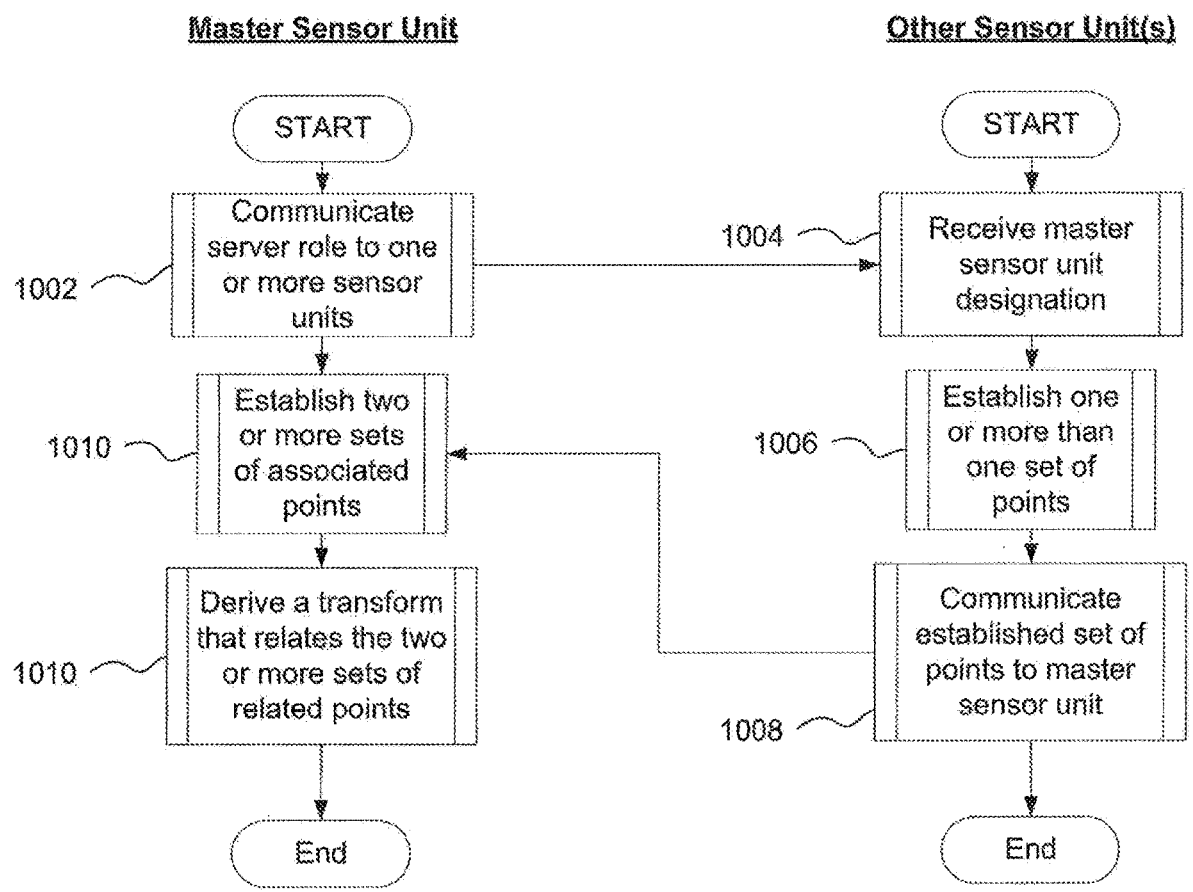
FIG. 10 depicts a flow chart according to example implementations.

Referring to FIG. 10, there is shown a view 1000 of a pair of flow charts 1000 for initialising or calibrating the sensor units with respect to one another. The first sensor unit to establish a ground plane is deemed to be a controlling or master sensor unit. Therefore, once a ground plane has been established, a communication to that effect is sent, at 1002, to any other sensor units. One or more than one sensor unit of any other sensor units receives the communication issued by the master sensor unit at 1004. At 1006, the one or more than one receiving sensor unit establishes a set of points associated with one or more than one moving object such as, for example, a moving player. At 1008, the one or more than one set of points is forwarded to the master sensor unit.

In response to receiving the one or more than one set of points associated with one or more than one moving object at 1008, the master sensor unit derives, at 1010, a transform that relates one or more sets of related points as determined by the master sensor unit and as determined by one or more than one sensor unit that are associated with the same moving object. Example implementations provide such a transform between the master sensor unit and each sensor unit returning such points. More particularly, implementations can provide a transformation between the coordinate frames of reference of selected sensor units. The transformations allow points of any given sensor unit to be mapped into a common frame of reference. The common frame of reference can be the frame of reference of the ranging sensor of the master sensor unit. The transform can be used to determine the relative positions of the sensors units. The transform can comprise at least one, or both, of the above described rotation and translation matrices.

Referring to FIG. 11, there is shown a view 1100 of such a transform between a set of points associated with a moving object as measured by the master sensor unit, and a set of points associated with the moving object, as measured by another sensor unit. A set 1102 of points of the 3D point cloud of the master reference unit, or a line fitting such a set of points, is shown within the context of the frame of reference 1104 of the master sensor unit. The frame of reference 1104 depicted is a Cartesian coordinate frame of reference having mutually orthogonal x, y and z axes 1106, 1108, 1110. Also shown is a further set of points 1112 of a 3D point cloud within the context of a further frame of reference 1114. The further frame of reference in the implementation shown is a Cartesian frame of reference comprising mutually orthogonal x, y and z axes 1116, 1118, 1120. The further frame of reference 1114 is associated with the other sensor unit.

It can be appreciated from the co-location 1122 of the frames of reference 1104, 1114 that a transform 1124 between the frames of reference 1104, 1114 can be determined as described above at 1010 with reference to FIG. 10. The transform 1124 can be expressed in any form, but has been expressed in terms of a rotation comprising at least three angles representing the relative orientations of corresponding axes of the frames of reference 1104, 1114. In the implementation shown the rotation is expressed as a function of the three angles 1126, 1128, 1130.

Such a transformation can be derived for pairs of sensor units, in particular, such a transformation can be derived between the master sensor unit frame of reference and each frame of reference of the other sensor units. Such transformations allow points of a 3D point cloud of a frame of reference of a sensor unit to be mapped into a common frame of reference. In the examples described, the common frame of reference is the frame of reference 1104 of the master sensor unit.

To support establishing such transformations comparisons can be made between corresponding sets of points of respective 3D point clouds associated with different sensors that relate to the same object. Example implementations can give effect to such comparisons in several ways that involve identifying foreground or moving objects associated with ranging measurements that differ from the background image by a predetermined threshold. For example, the predetermined threshold can be between 10 cm and 30 cm. Example implementations can be realised in which the predetermined threshold is 20 cm.

Multiple moving objects within a field of view of a ranging sensor will give rise to respective foreground ranging measurements that will create respective points in a respective 3D point cloud. Example implementations are arranged to cluster, or otherwise associate, points that are, or that could be, associated with a common moving object such as, for example, a player or other entity.

A cluster can be formed by identifying points in a 3D point cloud that fall within a predetermined distance of one another. For example, implementations can be realised in which a cluster of points of a 3D point cloud are the points that fall within a first horizontal distance and within a first vertical distance of an initial starting point. The first horizontal and vertical distances can be, for example, between 0.4 m and 0.6 m and 2 m and 3 m respectively. Example implementations can be realised in which the first horizontal and vertical distances are 0.5 m and 2.5 m respectively. It will be appreciated that accumulating points into a cluster can also use associated depth distance, such as, for example, a depth of between 0.5 m and 2 m such as, for example, 1 m.

The initial starting point can be selected several ways. For example, clustering can start from an initial foreground point that is the first point to be determined by the ranging sensor as being a foreground point. Other ways of selecting an initial starting point for forming one or more than one cluster of points can be to select the point closest to a pre-determined grid point or selecting points based on point distribution. For example, if there are 2000 points per unit volume or per unit area, that spread or group of the points could be considered to be a starting position. It will be appreciated that such a density or distribution based approach could be realised by, for example, determining or finding regions of points having a predetermined density per unit volume or area that exceeds or meets a respective threshold, which could involve searching the 3D point space for such regions. For example, an initial unit volume could be established and a search of all points, or at least a subset of all points, of a 3D point could for regions of the 3D point cloud having a respective point density given the initial unit volume could be undertaken Each searched point could be used as the centre of the initial unit volume and the point density could be all points falling within that initial unit volume centred on a currently considered point.

A cluster is formed progressively until all points within the predetermined first and second distances have been designated as forming part of a respective cluster. Alternatively, or additionally, the process of forming a cluster is continued until a predetermined threshold number of points is reached.

A cluster of points provides a set of foreground points at a respective position within the frame of reference at a respective point in time associated with a foreground or moving object. Multiple scans of the ranging sensor will give further clusters of foreground points associated with the same moving object that are at least one, or both, of temporally or spatially displaced relative to one another. A set of such further clusters of foreground points associated with the same moving object that are at least one, or both, of temporally or spatially displaced is used to form a path or tracklet. A curve or tracklet is fitted to one or more than one of the clusters. The curve or tracklet is indicative of movement of the same moving object. The curve or tracklet can be formed from the set of clusters of foreground points associated with the same moving object in several ways. For example, a centroid for each cluster could be determined to form a set of points derived from the clusters and then a curve could be fitted to that set of points. Alternatively, or additionally, the set of clusters of points could be considered to form a volume of points and a curve could be fitted to or though such a volume of points. Alternatively, or additionally, rather than using the centroid of a cluster, some other point could be considered such as, for example, the median point of the cluster could be determined.

It will be appreciated that the sets of points 1102 and 1112 will be viewed from different angles since, in general, different sensors units will be differently orientated relative to one another when viewing a common volume. However, the representation of the sets of points in 3D space should be highly correlate when the sets of points 1102 and 1112 relate to the same moving object.

Figure 12A:
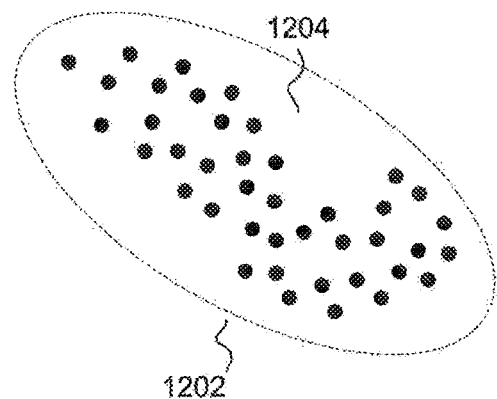
FIGS. 12A to 12C illustrate curve or tracklet derivation according to example implementations.
Figure 12B:
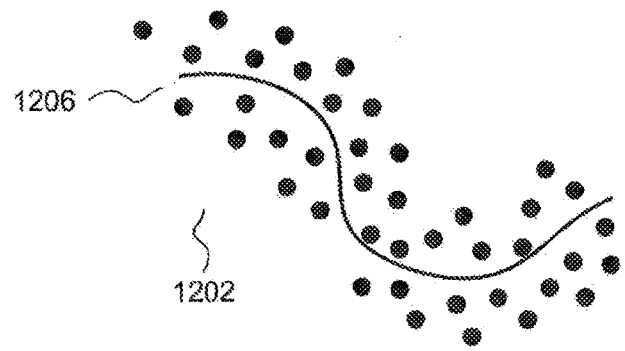
Figure 12C:
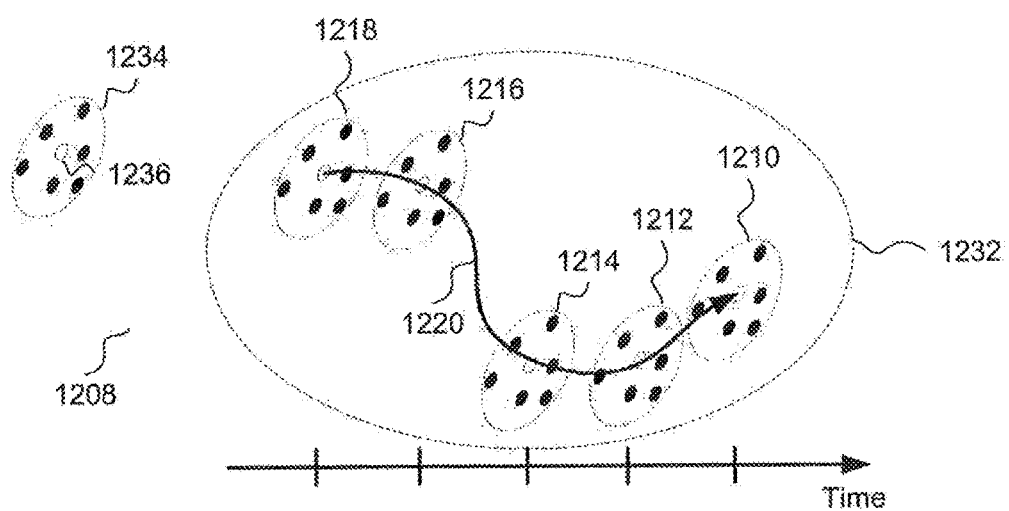

Referring to FIG. 12, in particular, sub-FIGS. 12A to 12C, clustering according to various implementations is depicted. Referring to FIG. 12A, there is shown a cluster 1202 of points 1204 of a 3D point cloud or of part of a 3D point cloud. Referring to FIG. 12B, the cluster 1202 points has an associated curve 1206 fitted to those points. The points 1204 shown in FIGS. 12A and 12B are depicted as being coplanar. However, example implementations are not limited to such an arrangement. Example implementations can be realised, as will be appreciated from FIG. 12C, in which the points are at least one of, or both of, distributed throughout the 3D point cloud or temporally distributed. Referring to FIG. 12C, there is shown a view 1208 of a number of sets of points 1210 to 1218 that have an associated curve of best fit 1220. Each of the sets of points 1210 to 1218 are associated with a common, or the same, moving object and represent samples or returns from that moving object taken at respective points in time. For illustrative purposes, five points in time 1222 to 1230 are shown. Each of the sets of points 1210 to 1218 can be considered as respective clusters of points. Alternatively, or additionally, the complete set of points 1210 to 1218 can be considered to form a respective cluster 1232. Still referring to FIG. 12C, it can be appreciated that a cluster of points 1234 comprises a plurality of points of the 3D point cloud. In the illustrated example, the plurality of points comprises six points. From the six points, a centroid 1236 is calculated. The curve of best fit 1220 can be determined based upon the centroids of each of the sets of points 1210 to 1218, or can be determined without using those centroids, that is, using all of the points within each, or a subset, of the sets 1210 to 1218.

All, or at least a subset, of the foreground points of a 3D point cloud produced by a sensor unit are processed until every point forms part of a respective cluster. Therefore, at any instant in time, or over a predetermined period of time, a field of view of a sensor unit will have a plurality of associated clusters relating to a plurality of foreground or moving objects.

It will be appreciated that different sensors will have respective views of the same moving object. The respective views of the same moving object will give rise to respective sets of foreground points associated with that object arising from respective sensor units. The foreground points associated with a moving object may have a set of one or more than one cluster, and, therefore, one or more than one curve or tracklet, and also have another set of one or more than one cluster and, therefore, one or more than one curve or tracklet.

Curves or tracklets associated with the same moving object can be grouped or otherwise associated with one another to be used in determining one or more than one metric associated with the moving object. In determining whether or not to group curves or tracklets associated with the same moving object, the curves or tracklets are compared. Curves or tracklets having a sufficient degree of similarity are grouped together as being associated with the same moving object.

Figure 12D:
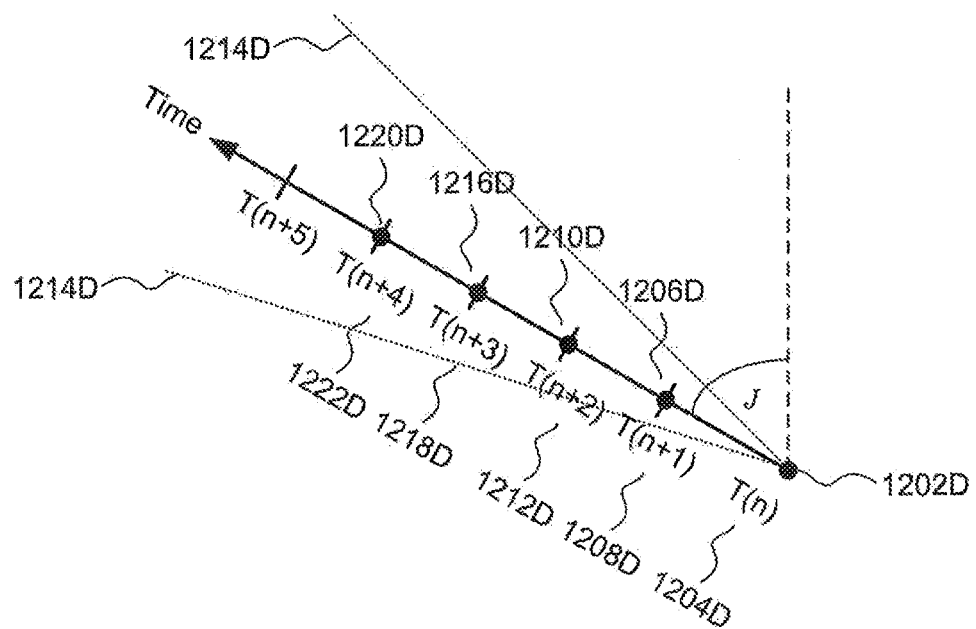
FIG. 12D shows curve or tracklet formation according to example implementations.

Referring to FIG. 12D, there is shown an alternative view 1200D of curve or tracklet determination according to an implementation. Assuming a given point 1202D at a time T(n) 1204D and an adjacent point 1206D at a respective time T(n+1) 1208D that, together, define a heading and a speed, a further or subsequent point 1210D at time T(n+2) 1212D is deemed to be part of the same curve or tracklet, that is, associated with the same moving object, if the further or subsequent point 1210D falls within at least one predetermined error bound 1214D. The error bound 1214D has been shown as a triangular shaped limit. Example implementations are not limited to such a triangular-shaped limit. Implementations can be realised in which the error bound is a solid such as, for example, a conical limit, or some other shaped limit. Similarly, a still further point 1216D at time T(n+3) 1218 can be considered to be part of the same curve or tracklet if that still further point 1216 falls within the error bound and so on for the yet further point 1220D at time T(n+4) 1222D. Although curve or tracklet determination has been demonstrated with reference to a linearly moving point, implementations are not limited thereto. It will be appreciated that the same technique of locating adjacent points that fall within the or a respective predetermined error bound will apply to a non-linearly moving point. The search for points relating to the same moving object, that is, the curve or tracklet determination can continue until a predetermine criterion is met such as, for example, a maximum curve or tracklet length is reached or until there are no further points that fall within the error bound or within a predetermined distance of the initial starting point of the curve or tracklet or within a predetermined time of the time corresponding to the initial starting point.

The at least one predetermined error bound 1214D can be at least one of static, or otherwise fixed, or dynamic. A fixed predetermined error bound 1214D is arranged to survey a fixed volume or search space when seeking to identify the next location of a moving object. A dynamic predetermined error bound is an error bound that adapts the survey volume or search space according to one or more than one of an event, measurement, parameter or at least one criterion. For example, example implementations can be realised in which the dynamic predetermined error bound is responsive to the moving object being tracked, or is at least responsive to a characteristic of the object being tracked. Such a characteristic can comprise, for example, one or more than one of speed, direction, velocity, relative speed, relative direction, relative velocity, present position within the frame of reference, or predicted or otherwise calculated position within the frame of reference at a future time taken jointly or severally in any and all permutations.

For example, example implementations can be realised in which the angle between the ranging sensor reference axis 120 and the direction vector or velocity vector of the moving object being tracked can influence the adaptation of the search space or search volume. It can be appreciated, for example, that such a vector that is normal or perpendicular to the ranging sensor reference axis 120 will benefit from at least one of widening or re-orientating in at least the direction of travel of the moving object. Additionally, or alternatively, the degree of widening or re-orientating can be associated with the speed of the moving object. With such re-orientating, it will be appreciated that the cone or volume defining the boundaries of the predetermined error bound can be arranged to follow the moving object. Similarly, as the above angle tends to zero, the search space or volume defined by the predetermined error bounds can be narrowed or reduced, which could have the advantage of improved or faster processing of the data within the search space or search volume due to fewer returns being contained within that search space or search volume. Example implementations can be realised in which the predetermined error bound is adapted in response to a predicted position within the ranging sensor frame of reference. Data associated with the moving object, such as, for example, at least one of speed, velocity or direction could be used to determine such a predicted position.

It will be appreciated that adapting the predetermined error bound, that is, the search space or search volume does not affect the field of view of the ranging sensor, which will, or can, continue concurrently scanning across the full field of view of the ranging sensor.

Figure 13:
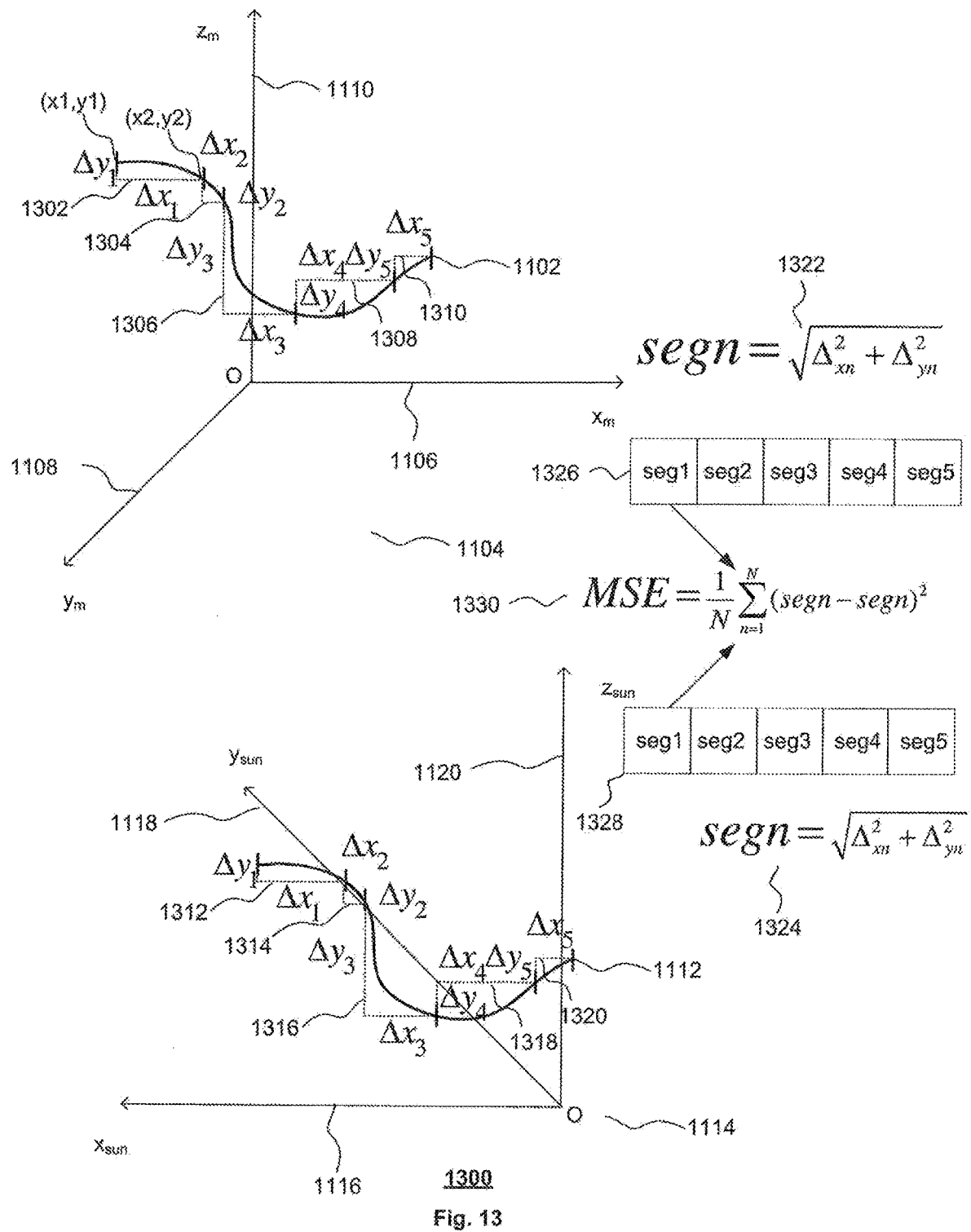
FIG. 13 depicts curve or tracklet assessment according to example implementations.

Referring to FIG. 13, there is shown a view 1300 of a comparison between tracklets 1102 and 1112. Each tracklet is divided into an equal number of portions, that is, is divided into the same number of portions. Corresponding portions of each tracklet have corresponding lengths. The lengths of each portion can be the same or can vary. The variation can be random. Alternatively, or additionally, the variation can be related to a characteristic of the tracklet 1102, 1112 such as, for example, a change in a parameter associated with the tracklet. The parameter can be, for example, the gradient. Therefore, referring to the first tracklet 1102, it has five segments or portions 1302 to 1310. The segments 1302 to 1310 have different lengths. Each of the segments, or at least a subset of the segments, are characterised. In the example illustrated, the segments are characterised by determining an approximation of segment length. The approximation of segment length can be derived from changes in start and end points of the segments. For example, the first segment 1302 has a variation in start and end points of $\Delta x_1 = x_2 - x_1$ and $\Delta y_1 = y_2 - y_1$, although the example implementation has been described with reference to using (x, y), example implementations are not limited to such an arrangement. Example implementations can be realised that determine the distance between adjacent points using respective 3D coordinates, (x, y, z), of those adjacent points. Similarly, each segment has respective start and end point variations, of $\Delta x_i = x_{i+1} - x_i$ and $\Delta y_i = y_{i+1} - y_i$, where i=1, 2, ..., N−1 where N is the number of samples or 30 points for the curve or tracklet of the moving foreground object.

Although determining a characteristic of each line segment for the curves 1102 and 1112 has been described with reference to using (x,y) coordinates, example implementations are not limited thereto. Example implementations can use coordinates expressed in a frame of reference other than a Cartesian frame of reference. Furthermore, example implementations can, additionally or alternatively, use coordinates other than 2D coordinates such as, for example, 3D coordinates, that is, (X, Y, Z). The second line 1112 has also been divided into the same number of portions or segments 1312 to 1320 where corresponding portions or segments have the same length.

A characterising length associated with each segment is determined using a respective equation 1322 and 1324. Each segment length can be stored in a respective array 1326, 1328. A measure of similarity between the lines 1102 and 1112 is determined. In the example illustrated, the measure of similarity, or correlation between, the lines 1102 and 1112 is determined mathematically. The segment lengths, or at least a subset of the segment lengths, are used to determine the mean square error between the curves or tracklets 1102 and 1112 as can be appreciated from equation 1330. Although the example shown uses a mean square error calculation as the basis for comparing the two curves or tracklets 1102 and 1112, example implementations are not limited thereto. Example implementations can be realised that use some other measure of difference or similarity such as, for example, a cross-correlation function that compares or otherwise uses two given tracklets or curves.

Figure 14:
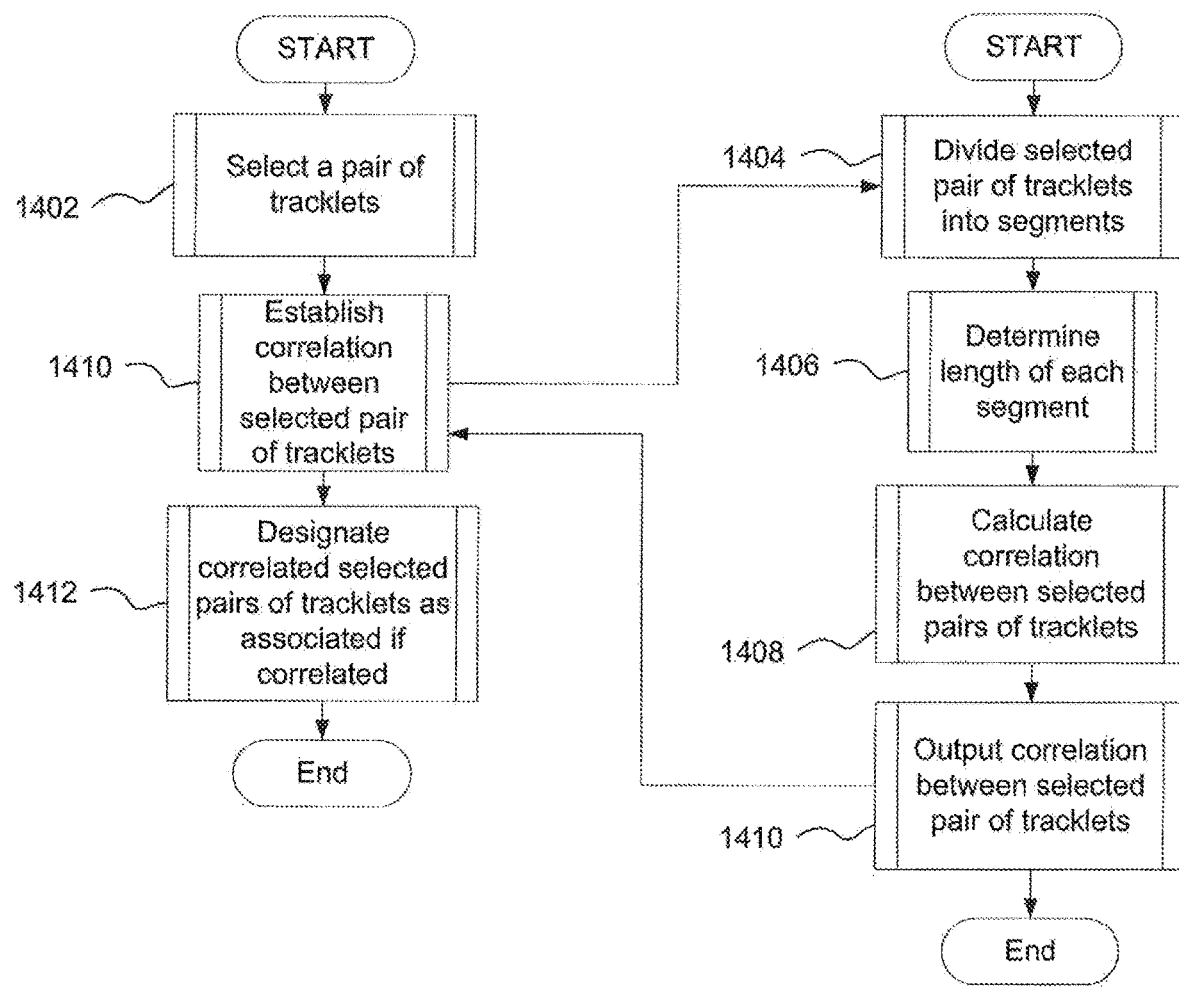
FIG. 14 shows a flow chart according to example implementations.

FIG. 14 shows a flow chart 1400 for making a comparison between the two curves or tracklets such as the curves or tracklets 1102, 1112. At 1402, two curves or tracklets to be compared are selected from a plurality of curves or tracklets of two or more than two 3D points clouds associated with two or more sensor units respectively. A determination is made, at 1404, regarding whether or not the two tracklets relate to the same moving object. The determination can comprise, according to an implementation, determining a degree of similarity or correlation between the two given curves or tracklets. At 1404, the two given curves or tracklets such as, for example, curves 1102, 1112, are separated into a plurality of segments. Corresponding segments can have the same size. Therefore, the nth segment of a first curve or tracklet can be or is the same size as the nth segment of a second curve or tracklet. A measure of each segment is made at 1406. Example implementations can be realised in which the measure can be, or is, associated with, the length of each segment. A correlation between the two curves or tracklets can be determined at 1408. Example implementations can be realised in which the correlation comprises evaluating an error function using the measures determined for the segments. The error function can be realised in the form of a mean square error function, or any other type of error function. For example, the mean square error function can be $$MSE = \frac{1}{N}\sum_{n=1}^{N}(segnp - segnq)^2,$$

where N is the number of samples, segnp is the length of the $n^{th}$ segment of the $p^{th}$ curve or tracklet and segnq is the length of the $n^{th}$ segment of the $q^{th}$ curve or tracklet. The correlation is output at 1410.

At 1412, the two curves or tracklets are designated as being associated with the same foreground moving object if they are sufficiently correlated. The two curves or tracklets can be deemed to be sufficiently correlated if the correlation between the two curves or tracklets meets one or more than one criterion. Example implementations can be realised in which the one or more than one criterion is a value of an error function that is below a predetermined threshold, such as, for example, if the mean square error function has a value of less than 0.05 to 0.2 such as, for example, 0.1.

Figure 15:
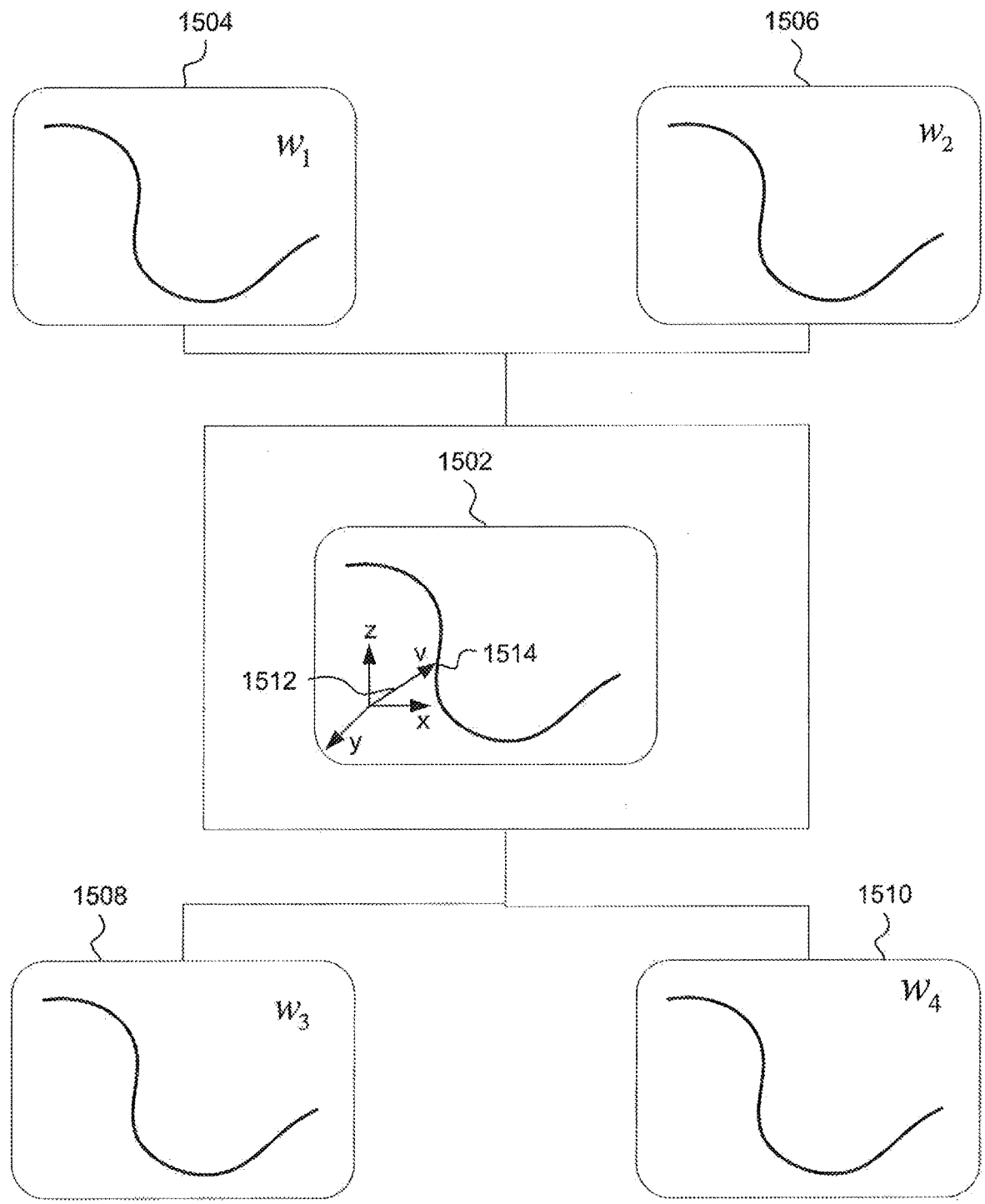
FIG. 15 illustrates actor or representative curve or tracklet derivation according to example implementations.

Referring to FIG. 15, there is shown a view 1500 of deriving a representative curve or tracklet 1502 associated with a moving object, that is, varying foreground points, from a plurality of curves or tracklets 1504 to 1510 designated as relating to the same moving object. The representative curve or tracklet 1502 can be derived from one or more than one of the plurality of curves or tracklets 1504 to 1510 in several ways. Example implementations can, for example, calculate a weighted average of the curves or tracklets, with the weightings being associated with the number of foreground points from which a curve or tracklet was derived.

Therefore, if two tracklets are observed but relate, in fact, to the same moving foreground object, that is, the same person or object, it is highly likely they will have a different number of points in the cluster. If a first tracklet, $t_1$, has 200 points and a second tracklet, $t_2$, has 50 points, a combined tracklet can be weighted towards the first tracklet estimate by a ratio of 4:1 as follows: the combined position, P(x, y, z) can be given by $$P(x, y, z) = \frac{200.t_1 + 50.t_2}{250}.$$

Therefore, it can be appreciated that in general a combined position can be determined from $$P(x, y, z) = \frac{m.t_1 + n.t_2}{m + n},$$

where m is the number of points associated with the first tracklet and n is the number of points associated with the second tracklet.

The representative curve or tracklet 1502 can have one or more than one associated characteristic. Such an associated characteristic can comprise a respective direction vector 1512 indicating the position in space of the curve or tracklet. The position in space can be derived from a curve or tracklet in several ways. For example, the centre or centroid 1514 of the curve or tracklet can be determined and the respective direction vector can be the vector that extends from the origin of the coordinate frame of reference to the centre or centroid of the curve or tracklet 1502.

Although the example described derives the representative curve or tracklet 1502 from four curves or tracklets 1504 to 1510, example implementations can use some other number of curves or tracklets in deriving the representative curve or tracklet 1502. For example, the representative tracklet 1502 can be derived from one or more than one curve or tracklet.

Figure 16:
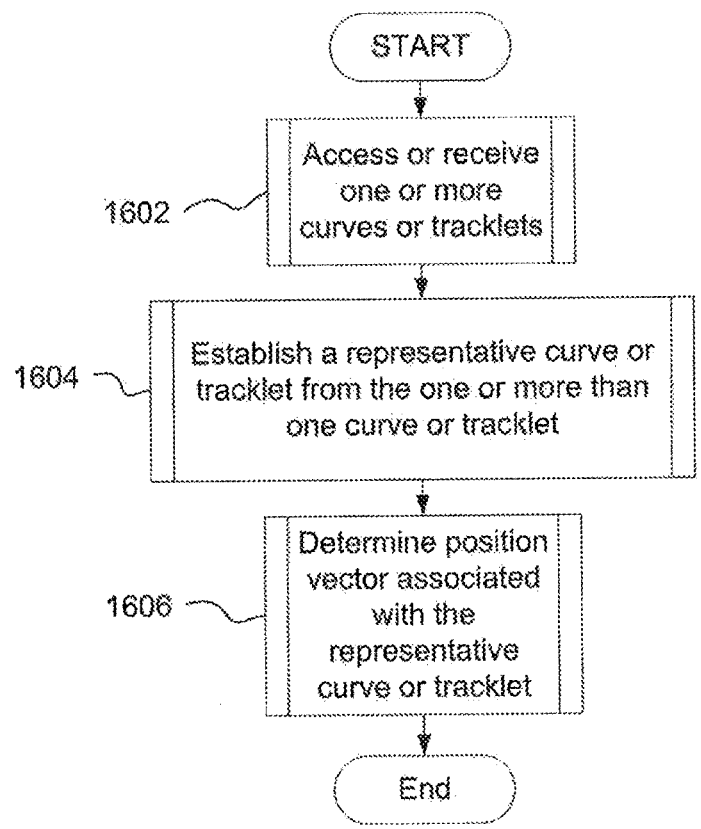
FIG. 16 shows a flow chart according to example implementations.

Referring to FIG. 16, there is shown a flow chart 1600 for determining a representative curve or tracklet, such as curve or tracklet 1502, and a corresponding position vector, such as vector 1512, from one or more than one curve or tracklet such as curves or tracklets 1504 to 1510. At 1602, one or more than one curve or tracklet is accessed or received. The one or more than one curve or tracklet can be, for example, the plurality of curves or tracklets 1502 to 1510 or a sub-set of such curves or tracklets. At 1604, the representative curve or tracklet is established or otherwise derived from the one or more than one curve or tracklet. Establishing the representative curve or tracklet can comprise determining or calculating a weighted average of the one or more than one curve or tracklet accessed or received at 1602. The weightings can be determined in several ways. For example, an implementation of such a weighting takes into account the number of points from which a curve or tracklet is derived such as, for example, the weighting can be proportional to the number of points from which the respective curve or tracklet is derived. Example implementations determine the weightings as indicated above. Therefore, given the weightings $w_1$, $w_2$, $w_3$, $w_4$, representing the number of points from which the respective curves or tracklets were derived, the weighted contributions to the representative curve or tracklet can be determined, for example, as follows:

$$P(x, y, z) = \frac{w_1.t_1 + w_2.t_2 + w_3.t_3 + w_4.t_4}{w_1 + w_2 + w_3 + w_4},$$

or in general $$P(x, y, z) = \frac{\sum_{i=1}^{N} w_i.t_i}{\sum_{i=1}^{N} w_i},$$

where N is the number of contributing tracklets, $w_i$ is the weighting associated with a respective curve or tracklet $t_i$.

At 1606, a position vector such as, for example, position vector 1512, is determined from the representative curve or tracklet 1502. The position vector 1512 is associated with a predetermined aspect of the representative curve or tracklet 1502. For example, implementations can associate the position vector with the centre or centroid of the curve or tracklet 1502. Alternatively, or additionally, the position vector can be associated with another aspect of the curve or tracklet, such as, for example, the start or end of the curve or tracklet, or a position determined from such a start and end.

Example implementations can be realised in which the curves or tracklets 1504 to 1510 to be combined to produce the representative curve or tracklet 1502 can be derived from the curves or tracklets associated with or produced by different sensor units. At least two or more of the curves or tracklets 1504 to 1510 used to produce the representative curve or tracklet 1502 can be produced by, or be derived from, curves or tracklets associated with at least two or more different sensor units. Combining curves or tracklets 1504 to 1510 from different sensors can have the advantage of improving the accuracy with which the representative curve or tracklet 1502 is indicative of the path taken by the moving object associated with the curves or tracklets 1502 to 1510. It will be appreciated that the fields of view of the respective sensors, in particular, the respective ranging sensor reference axes, such as the above-described ranging sensor reference axis 120, and their respective frames of reference will have respective orientations relating to one another, with respective rotational and translational transformations between any given pair of frames of reference being needed to map curves or tracklets into a common frame of reference.

Figure 17:
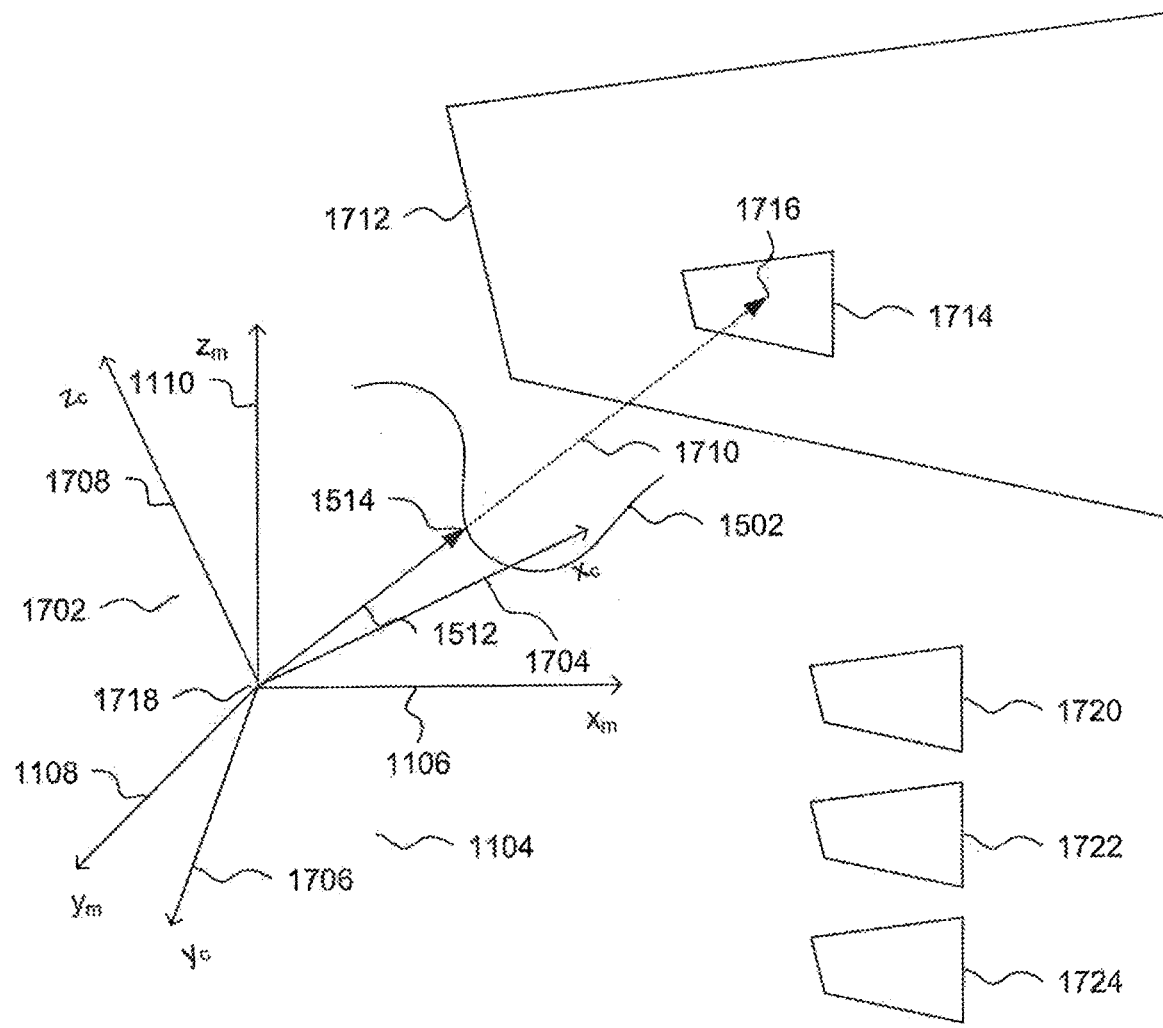
FIG. 17 depicts image extraction according to example implementations.

Referring to FIG. 17, there is shown a view 1700 of mapping the position vector 1512, which is expressed in terms of the frame of reference of the master sensor unit, into a camera frame of reference such as, for example, a frame of reference associated with a field of view of a camera of the master sensor unit. Assume, for example, that the sensor unit 102 shown in FIG. 1 is the master sensor unit.

The ranging sensor 104 will have a frame of reference associated with the field of view 108 of the ranging sensor 104. Similarly, the camera 106 will have a frame of reference associated with the field of view 110 of the camera. FIG. 17 shows the frame of reference 1104 of the ranging sensor and the frame of reference 1702 of the camera 106. The frame of reference 1104 of the ranging sensor comprises mutually orthogonal axes 1106 to 1110. The frame of reference 1702 of the camera comprises mutually orthogonal axes 1704 to 1708. A mapping or transformation between the two frames of references 1104 and 1702 is determined. The transformation can comprise a matrix. The transformation allows coordinates in one frame of reference to be mapped into the other frame of reference. Example implementations map the position vector 1512 into the camera frame of reference 1702 to give a camera position vector 1710.

The camera frame of reference 1702 has associated image data 1712 taken by the camera 106. The image data 1712 is an example of the above described video data and/or still image data. The image data 1712 is mapped into the camera frame of reference 1702, as will be described with reference to FIG. 20. The camera position vector 1710 is used to select a portion 1714 of the image data 1712 to be associated with the representative curve or tracklet 1502. The portion 1714 of the image data 1712 can have its centre at a point 1716. The point 1716 represents the point of intersection of the image data, expressed in the camera frame of reference 1702, with the camera position vector 1710. The size of the portion 1714 of the image data can vary with distance from the origin 1718 of the image data 1712 within the camera frame of reference. Example implementations increase the size of the portion 1714 the closer the image data 1712 is to the origin 1718 and decrease the size of the portion 1714 the farther the image data 1712 is from the origin 1718.

The image data 1712 is shown as being displaced from or distal relative to the centre 1514 of the representative curve or tracklet 1502. However, example implementations can comprise image data 1712 that is co-located with the curve or tracklet, or any part thereof, such as, for example, the centre 1514 of the representative curve or tracklet 1502. The image data can be derived from the camera associated with the master sensor unit, or any, or any other, sensor unit. For example, the image data can be derived from the one or more than one of camera of any other sensor unit. In such a case, the frames of reference 1104 and 1702 will represent the frame of reference of the master sensor unit ranging sensor and the frame of reference of the camera of the another such sensor unit. Accordingly, multiple portions 1720 to 1724 of image data can be extracted from the image data associated with the one or more than one camera of any other sensor units.

The extracted image data 1714, 1720 to 1724, can be used to provide at least one, or both, of still image data or video data associated with the moving object related to or represented by the representative curve or tracklet 1502.

Figure 18:
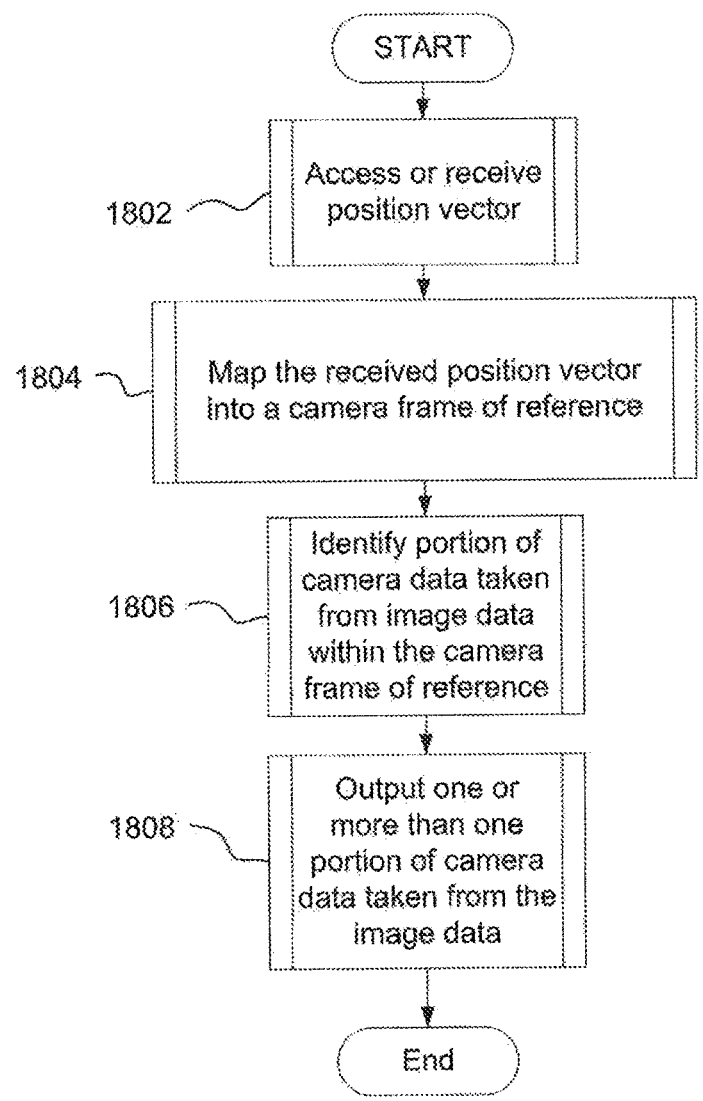
FIG. 18 shows a flow chart for image extraction according to example implementations.

Referring to FIG. 18, there is shown a flow chart 1800 for extracting image data to be associated with the representative curve or tracklet 1502. At 1802, the position vector 1512 of the representative curve or tracklet 1502 is accessed or received. The position vector 1512, at 1804, is mapped from the frame of reference 1104 of the ranging sensor into the frame of reference 1702 of a camera. The camera can be one or more than one of the camera associated with the master sensor unit and one or more than one camera associated with one or more than one further sensor unit.

At 1806, a portion 1714 of image data 1712 is identified within, or extracted from, the image data 1712 taken by the one or more than one camera. The portion 1714 of the image data 1712 is identified using the position vector 1512, in particular, the point of intersection 1716 between the image data 1712 and the position vector or scaled version thereof.

At 1808, the identified or extracted portion 1714 of the image data 1712 is output for further processing. The image data 1712 can be used for several objectives comprising, for example, visually identifying of a player, verifying the data and checking data consistency manually, or for providing context/reference images to a player/club after the game and the like.

Figure 19:
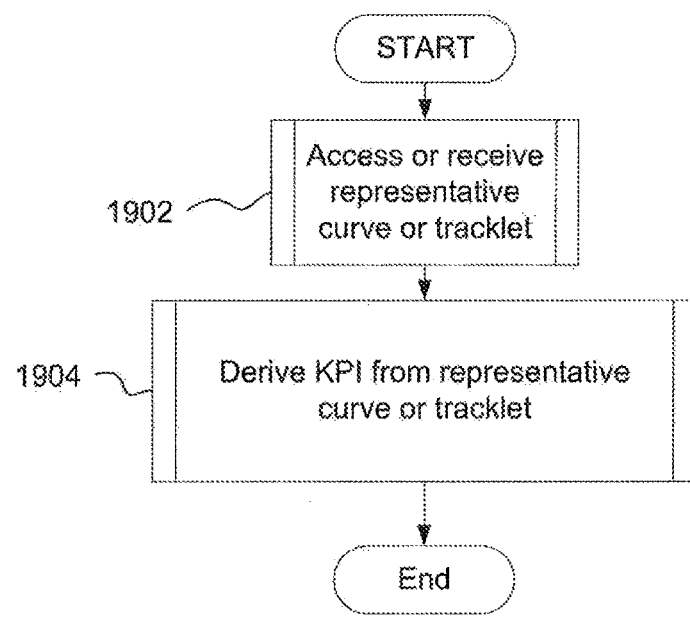
FIG. 19 illustrates a flow chart for performance measurement according to example implementations.

Referring to FIG. 19, there is shown a view of a flow chart 1900 for determining one or more than one metric associated with a curve or tracklet such as, for example, a representative curve or tracklet 1502. Example implementations can determine, for example, at least one, or both, of speed or direction from a curve or tracklet. In the following, one or more than one metric will be derived from the representative curve or tracklet. However, such a metric can be derived from a curve or tracklet other than a representative curve or tracklet.

At 1902, the representative curve or tracklet 1502 is accessed or received. At 1904, one or more than one metric, KPI, is derived from the representative curve or tracklet 1502. For example, the speed of the moving foreground object associated with the representative curve or tracklet can be derived from the combination of the segment length measure or estimation and the time period between one or more than one sample or scan times 1230 to 1222 of a ranging sensor. For example, using the length, l, of the third segment 1306, which is given by $l=\sqrt{(\Delta x_3^2 + \Delta y_3^2)}$ and the time difference between the scan or cycle time of the ranging sensor of $\Delta t = T(n-2) - T(n-3)$, the speed, s, of the moving foreground object over that time interval will be given by $$s = \frac{\sqrt{(\Delta x_3^2 + \Delta y_3^2)}}{T(n-2) - T(n-3)}.$$

Further, the direction of the moving foreground object can be estimated over the same time period as $\underline{d} = (x4-x3)\hat{i} + (y4-y3)\hat{j}$. It can be appreciated that the above speed and direction estimates can be combined to produce a vector associated with the representative curve or tracklet. Alternatively, or additionally, although the above speed and direction have been estimated using a single segment of the representative curve or tracklet, example implementations are not limited to such arrangements. Example implementations can be produced in which at least one, or both, of the speed or direction associated with the representative curve or tracklet 1502 is derived from one or more than one segment of the representative curve or tracklet. For example, a plurality of segments can be used to derived an average or representative speed or direction. As an example, the speed and direction of the first 1302 and second 1304 segments can be determined as $s_{seg1}$, $\underline{d}_{seg1}$ and $s_{seg2}$, $\underline{d}_{seg2}$ such that the average or representative speed and direction would be given by $$s_{rep} = \frac{s_{seg1} + s_{seg2}}{2} \text{ and } \underline{d}_{rep} = \underline{d}_{seg1} + \underline{d}_{seg2}.$$

Figure 20:
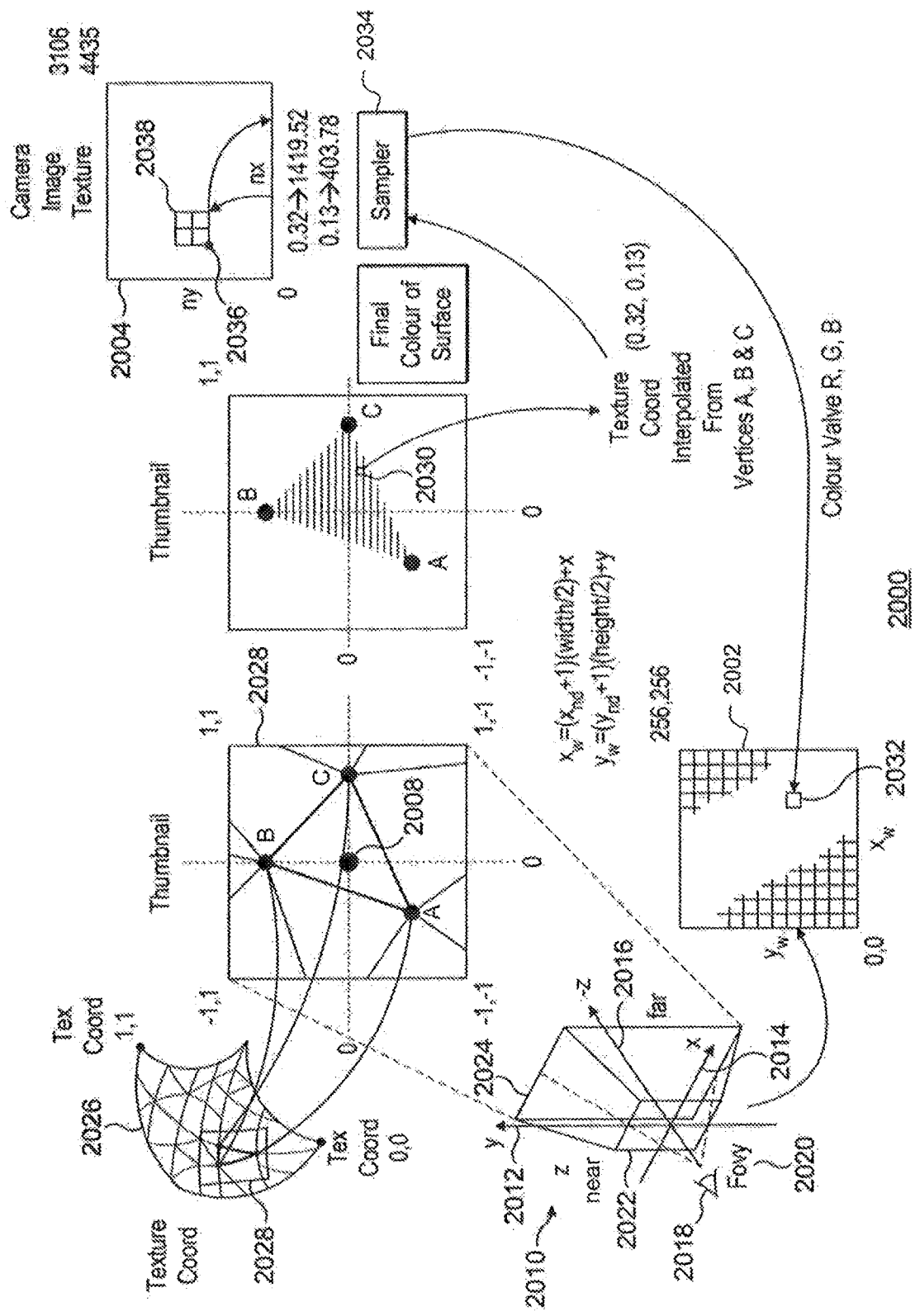
FIG. 20 depicts a technique for determining colour space data for a thumbnail according to example implementations.

Referring to FIG. 20, there is shown a view 2000 of establishing image data for a target image 2002 using camera data 2004 given a representative point PT 2008. The target image is an example of the above described thumbnail image produced by the image data processor 116 that produces thumbnail images from a set of camera data 434 output by the image compression circuitry 422. The point PT 2008 is an example of the above described point 1514 associated with a representative curve or tracklet 1502. The point PT 2008 is mapped from the ranging sensor, or LiDAR, frame of reference into a further frame of reference 2010.

The further frame of reference will be referred to an OpenGL frame of reference or camera frame of reference. It can be appreciated that the further frame of reference 2010 comprises mutually orthogonal axes x 2012, y 2014, z 2016. The –z axis extends away from a deemed view point 2018 that presents an associated field of view FOVY 2020 comprising a z near clipping pane 2022, $z_{near}$, and a z far clipping pane 2024, $z_{far}$. The values of the z near clipping pane and z far clipping pane can be predetermined as, for example, 0.1 and 100 respectively, but could equally well be some other values.

Therefore, given the coordinates of the point PT 2008, $$PT_{LiDAR} = \begin{bmatrix} x \\ y \\ z \end{bmatrix}$$

in the LiDAR frame of reference, a corresponding point, $$PT_{OpenGL} = R \begin{bmatrix} x \\ y \\ z \end{bmatrix} + T = P_{x,y,z}$$

is determined in the OpenGL frame of reference, where:
(x, y, z) represent the coordinates of the point $PT_{LiDAR}$ in the LiDAR frame of reference;
R is a rotational matrix that rotates the point (x, y, z) to align the axes of the LiDAR frame of reference and the OpenGL frame of reference;
T is a translational matrix to make the origins of the LiDAR frame of reference and the OpenGL frame of reference coincide.

The vertical field of view FOVY 2020 is established using FOVY=2 arctan(size/distance to target) but constrained to return a value in the range of –pi to pi, as opposed to –2 pi to 2 pi.

The centre of the z near clipping pane coincides with the origin of the OpenGL frame of reference. The z near clipping pane 2022 is arranged to have a predetermined size.

Example implementations provide a z near clipping pane 2022 having dimensions of 256×256 pixels. Implementations are not limited to such a 256×256 pixel size and other dimensions could alternatively or additionally be used. Therefore, it can be appreciated that the aspect ratio of FOVx/FOVy=1, but it could equally well be some other value. A perspective matrix is determined as follows $$P = \begin{bmatrix} \frac{f}{aspect} & 0 & 0 & 0 \\ 0 & f & 0 & 0 \\ 0 & 0 & \frac{z_{far}+z_{near}}{z_{far}-z_{near}} & \frac{2z_{far}z_{near}}{z_{near}-z_{far}} \\ 0 & 0 & -1 & 0 \end{bmatrix},$$

where $$\text{aspect} = \frac{FOVX}{FOVY},$$

FOVX is the horizontal field of view width and FOVY is the vertical field of view width, and $f = \cot(FOVY/2)$.

Also shown in FIG. 20 is a texture mesh 2026. The texture mesh comprises a plurality of nodes forming connected polygons, which are triangles in the present example. The viewing point 2018 and the z near clipping pane are directed towards the representative point PT 2008, which defines an area 2028 of the mesh 2026 being viewed or to be viewed. The point PT 2008 lies on the –z axis 2016 and is centred within the area 2028. Referring to the enlarged view of the area 2028, it can be appreciated that three vertices A, B, C of the mesh 2028 are shown as falling within the field of view 2020 defined by the point PT 2008. Example implementations have been described as having three vertices within the area 2028. However, other implementations will have significantly more vertices within the area 2028. The area 2028, known as a model view perspective, is defined, at least in part, using a Look At Matrix, $$M = \begin{pmatrix} sx & sy & sz & 0 \\ ux & uy & uz & 0 \\ fx' & fy' & fz' & 0 \\ 0 & 0 & 0 & 1 \end{pmatrix},$$

which defines a view point, where:
$F = P_{x,y,z} - Eye_{x,y,z}$, where $P_{x,y,z}$ is the target pixel and $Eye_{x,y,z}$ is the location of the eye 2018, $$f' = \frac{F}{\|F\|} = (fx', fy', fz'),$$

$$s = f'.UP'' = (sx, sy, sz),$$

$$UP'' = \begin{bmatrix} 0 \\ 1 \\ 0 \end{bmatrix} \text{ and}$$

$$u = \left(\frac{s}{\|s\|}\right).f'$$

and the perspective matrix as follows; the model view perspective, MVP, is given by $$MVP = P.M. \begin{bmatrix} x \\ y \\ z \\ 1 \end{bmatrix},$$

where $\begin{bmatrix} x \\ y \\ z \\ 1 \end{bmatrix}$ is a vertex of the mesh. The model perspective view is evaluated for each vertex of the mesh to determine which vertices are within the field of view.

The area 2028 is considered to be a normalised grid having normalised coordinates of (−1,−1), (−1,1), (1,1), (1,−1). The normalised coordinates can be an example of normalised device coordinates. The area 2002 is populated with colour derived from the camera image 2004, which is considered to be a texture map, that is, a camera image texture map. The normalised grid is divided into a plurality of pixels; a representative or example pixel 2030 is shown. The example pixel 2030 will be used to demonstrate how colour is determined for a corresponding pixel 2032 in the field of view or target image 2002. The coordinates of the example pixel 2030, in terms of the normalised coordinates, are determined. In the example given, the normalised coordinates of the example pixel 2030 are deemed to be (0.32, 0.13). The example pixel normalised coordinates are used, by, for example, a sampler 2034, as an index into the camera image or camera image texture data 2004 at respective coordinates within that camera image 2004. A sampler can be realised as part of the data processing system, that is, as a combination of at least one, or both, of hardware and software. The dimensions of the camera image 2004 can be any dimensions $n_x \times n_y$. Given a point (u,v) expressed in normalised coordinates of the example pixel, the corresponding coordinates (i, j) in the camera image 2004 are given by i=⌊nx.u⌋ and j=⌊ny.v⌋, that is, (⌊nx.u⌋,⌊ny.v⌋). Therefore, for example, assuming that nx=3106 and ny=4436 gives nx.u=1419.52 and ny.v=403.78 and (⌊nx.u⌋, ⌊ny.v⌋)=(1419,403), as depicted by point 2036. The integer parts of the products $n_x$.x and ny are used as the camera image coordinates to access corresponding colour data. The colour data can be expressed in any colour space. Example implementations will be described that use the RGB colour space. Therefore, example implementations could return the RGB values within the camera image 2004 at the coordinates (i, j). However, example implementations can alternatively or additionally derive colour data in other ways. For example, the initially determined camera image coordinates (i, j) can be deemed to be an index to a group of pixels 2038. The group of pixels 2038 can be a quartet of pixels or some other number of pixels. The decimal part of the products $n_x.u$ and ny.v can be used to return colour data derived from the group of pixels using interpolation.

As an example, decimal part 0.52 of nx.u=1419.52 can be used to derive first interim colour data from the bottom two pixels of the group of pixels in a weighted manner. Considering just one channel, that is, one colour, of the colour space such as, for example, red, assuming that the red values of the bottom left and bottom right pixels are $R_{BL}$ and $R_{BR}$ respectively, an overall or average bottom $R_B$ value is derived from $R_B=(1-0.52)R_{BL}+0.52R_{BR}$, that is, assuming that the decimal part is t, in general, the red colour value would be $R_B=(1-t)R_{BL}+tR_{BR}$. Similarly, the decimal part of ny.v can be used to derived a corresponding red value from the top left and top right pixels. Assuming the top left and top right pixels have respective values of $R_{TL}$ and $R_{TR}$ respectively, an overall or average bottom $R_T$ value is derived from $R_T=(1-0.78)R_{TL}+0.78R_{TR}$, that is, assuming that the decimal part is t', in general, the red colour value would be $R_T=(1-t')R_{TL}+t'R_{TR}$. Therefore, an overall red channel colour value, R, can be derived from $R_T$ and $R_B$. For example, example implementations can return $R=R_T+R_B$ or some other value such as, for example, an average of $R_T$ and $R_B$. The above can be performed for each colour channel of a colour space, which would additionally comprise green, G, and blue, B, values for the RGB colour space. Therefore, colour space values can be derived from the camera image 2004 for the example or target pixel 2032 in the image 2002. The retrieved or determined colour space values for the example pixel 2030 are mapped into the image 2002 using a corresponding transform to map the normalised coordinates of the example pixel into corresponding coordinates of the image 2002. An example implementation of the transforms comprises $x_w=(x_{nd}+1)(\text{width}/2)+x$ and $y_w=(y_{nd}+1)(\text{height}/2)+y$, where $(x_{nd}, y_{nd})$ are the normalised coordinates of the example pixel 2030, that is, the normalised device coordinates, $(x_w, y_w)$ are the coordinates of the pixels of the image 2002, width and height are the width and height, in pixels, of the image 2002, and (x, y) are coordinates of the image 2002 such as, for example, the coordinates of the bottom left corner of the image 2002. Example implementations can use x=0 and y=0.

Repeating the process of determining colour values for each pixel in the area 2028 is continued until the image 2002 has been populated with colour derived from the camera image 2004.

Figure 21:
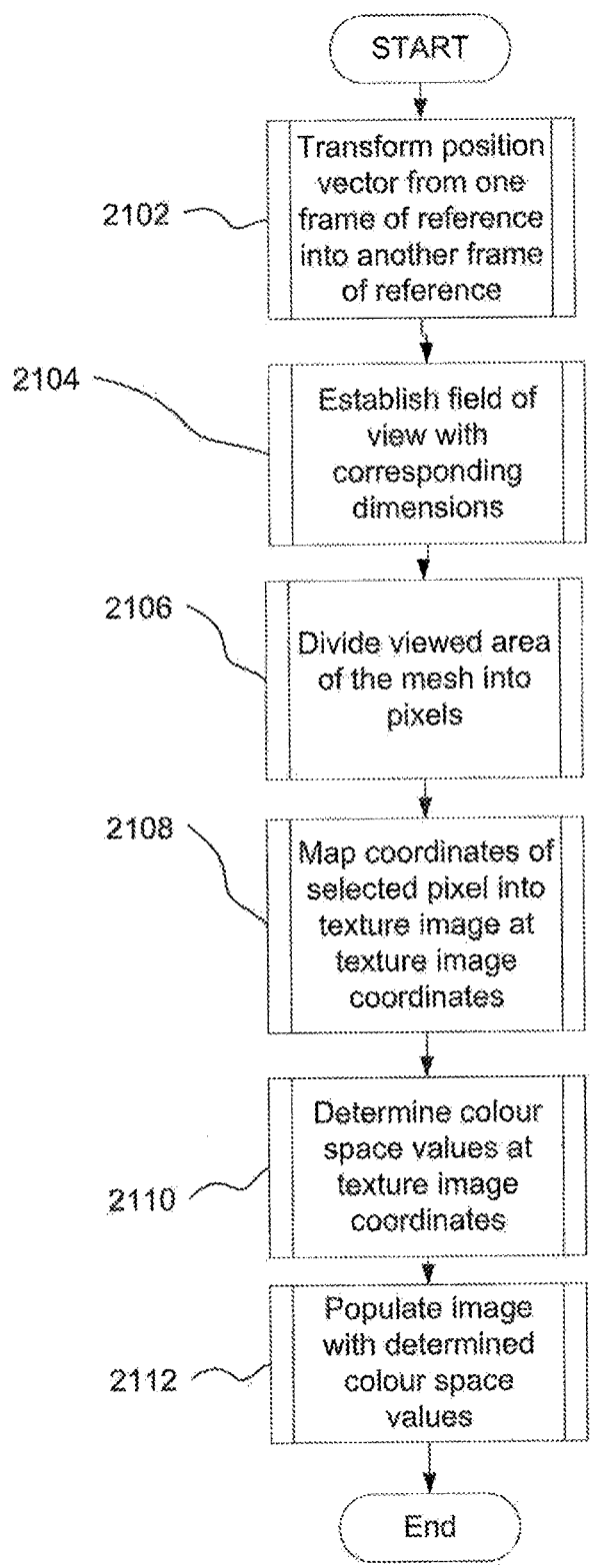
FIG. 21 shows a flow chart for determining colour space data for the thumbnail according to example implementations.

Referring to FIG. 21, there is shown a flow chart 2100 for establishing image data for an image to be generated. At step 2102, the position vector 1514 is transformed from the frame of reference of the ranging sensor 1104 into the OpenGL frame of reference. The above described frame of reference 1112 is an example of an OpenGL frame of reference. The field of view is established at 2104, which provides a view or area 2028 of the mesh 2026. The field of view is arranged to have predetermined dimensions. In the example implementation described, the predetermined dimensions are 256 pixel by 256 pixels, that is, the above described width is 256 pixels and the above described height is 256 pixels.

The view or area 2028 of the mesh 2026 is divided into, or has an associated, grid of pixels such as, for example, such as pixel 2030 at 2106. At 2108, for each pixel in the grid, corresponding colour values of a respective colour space are determined from a texture image 2004, which is an image taken by the camera. The colour values are determined from the texture image 2004 at 2110. At 2112, the determined colour values are used to create the image 2002 at the appropriate pixel position 2032.

Example implementations of the present disclosure can be realised in the form of, or using, hardware, software or a combination of hardware and software. The hardware can comprise at least one of a processor and electronics. The foregoing, that is, the hardware, software or a combination of hardware and software, are implementations of circuitry. The circuitry can be configured or arranged to perform a respective purpose such as, for example, implementing any and all of the example implementations described in this specification. Any such software may be stored in the form of executable code on volatile or non-volatile storage such as, for example, a storage device like a ROM, whether erasable or rewritable or not, or in the form of memory such as, for example, RAM, memory chips, device or integrated circuits or machine-readable storage such as, for example, DVD, memory stick or solid-state medium. Storage devices and storage media are example implementations of non-transitory machine-readable storage that are suitable for storing a program or programs, that is, executable code, comprising instructions arranged, when executed, realise example implementations described and claimed herein. Accordingly, example implementations provide machine executable code for realising an apparatus, system, device, method or for orchestrating a method, apparatus, system or device operation as described in this specification or as claimed in this specification and/or as depicted in any of the drawings of this specification and machine-readable storage storing such code. Still further, such programs or code may be conveyed electronically via any medium such as a communication signal carried over a wired or wireless connection and example implementations suitably encompass the same.

The apparatus can comprise a controller, circuitry or processor to control at least one such apparatus according to any method as described or claimed herein. Similarly, example implementations can provide a controller, circuitry or processor to orchestrate or implement any method, apparatus, device and/or system as described or claimed herein. Furthermore, any such methods can be realised, at least in part, using machine executable code comprising instructions arranged, when executed by at least one processor, to control or implement any method described or claimed herein. Example, implementations provide non-transitory machine-readable storage storing such machine executable code.

Example implementations of any systems, device, apparatuses, methods, and flowcharts described in this application can be realised in the form of machine-executable instructions arranged, when executed by a machine, to implement any or all aspects, processes, activities or flowcharts, taken jointly and severally in any and all permutations, described in this application. It will be appreciated that circuitry as used herein can comprise one or more than one of physical electronic circuitry, software, hardware or application specific integrated circuitry, taken jointly or severally in any and all permutations.

Therefore, implementations also provide machine-readable storage storing such machine-executable instructions. The machine-readable storage can comprise transitory or non-transitory machine-readable storage. The machine can comprise one or more processors, or other circuitry, for executing the instructions or implementing the instructions.

Figure 22:
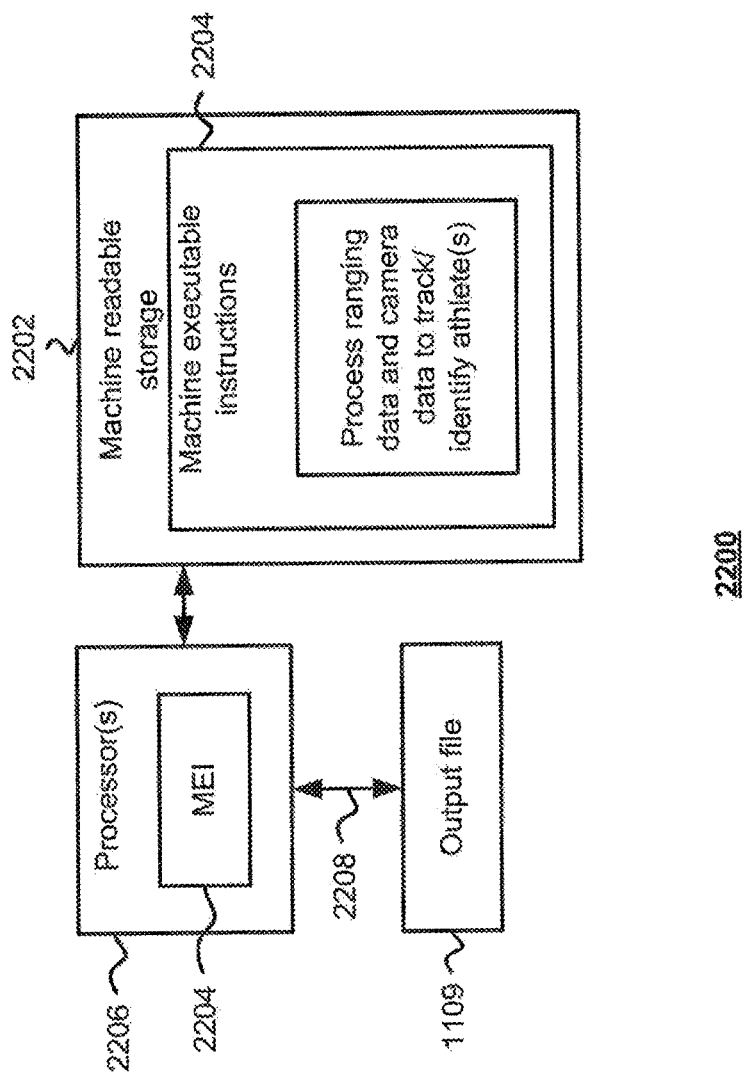
FIG. 22 shows a view of machine-executable instructions and machine-readable storage according to example implementations.

Accordingly, referring to FIG. 22, there is shown a view 2200 of implementations of at least one of machine-executable instructions or machine-readable storage. FIG. 22 shows machine-readable storage 2202. The machine-readable storage 2202 can be realised using any type of volatile or non-volatile storage such as, for example, memory, a ROM, RAM, EEPROM, or other electrical storage, or magnetic or optical storage or the like. The machine-readable storage 2202 can be transitory or non-transitory. The machine-readable storage 2202 stores machine-executable instructions (MEIs) 2204. The MEIs 2204 comprise instructions that are executable by a processor or other instruction execution, or instruction implementation, circuitry 2206. The processor or other circuitry 2206 is responsive to executing or implementing the MEIs 2204 to perform any and all activities, processes, operations, methods or flowcharts described and/or claimed in this application. Although the above example implementations have been described with reference to static sensor units such as the sensor units 302 to 308, example implementations are not limited to such an arrangement. Example implementations can be realised in which the sensor units are mobile. It will be appreciated that mobile sensor units can be moved to a fixed position, set-up or otherwise calibrated and used as described above. Having been moved to a fixed position the mobile sensor would implement the process of, for example, FIG. 7.

The example implementations can survey or monitor a relatively large volume using the ranging sensor. The range or effectiveness of the ranging sensor is limited by the sensitivity of the photodetectors, the initial strength of the laser light at the point of output or transmission, and the reflection coefficient of the object from which the light is reflected. The foregoing could result, for example, in a ranging sensors range being significant. For example, the ranging sensor range could extent towards, and encompass, another ranging sensor. Example implementations can be realised in which the ranging data is filtered to limit the amount of data to be processed. For example, returns having a round trip flight duration beyond a predetermined time limit could be excluded, which could help in separating foreground returns from background returns.

Although the example implementations have described using a ranging sensor such as, for example, LIDAR sensor, to detect moving objects, implementations are not limited to such as arrangement. Example implementations can be realised in which moving objects are detected and data associated with such moving objects use or rely on other technologies. For example, moving objects can be detected using, for example, speed sensing technology like Doppler based LIDAR, a doppler radar and the like. Still further such other technologies can be used instead of, or in conjunction with, the ranging sensors such as LIDAR.

The invention claimed is:

1. An apparatus to track one or more than one athlete performing in an athletic event within a sports environment, the apparatus comprising:
   a. a laser ranging system (LIDAR system), and a camera;
      i. the LIDAR system and the camera bearing respective fields of view, the fields of view are arranged to overlap to survey a common volume of the sports environment,
      iii. the LIDAR system is arranged: to produce LIDAR data relating to a respective set of one or more than one athlete of said one or more than one athlete performing in the athletic event within the spoils environment, the LIDAR system being arranged to process the LIDAR data to distinguish between foreground points and background range data; the foreground points being associated with at least said respective set of one or more than one athlete of said one or more than one athlete performing in the athletic event within the sports environment; and
      iii. the camera is arranged to produce camera video image data relating to a respective set of one or more than one athlete of said one or more than one athlete performing in the athletic event within sports environment objects; and
   b. a correlator:
      i. to identify or correlate, said foreground points and camera video image data associated with a common athlete in both sets of said one or more than one athlete of said one or more than one athlete performing in the athletic event within the sports environment, within the field of views of both the LIDAR system and the camera;
ii. to determine the identity of the common athlete from said the camera video image data associated with the common athlete; and
iii. to produce athlete attribute data associated with the identity of the common athlete (KPI); the athlete attribute data comprising at least one or more than one of position, speed, direction or velocity data.

2. The apparatus of claim 1, in which the correlator to correlate data associated with at least one athlete of the respective set of one or more than one athlete of said one or more than one athlete performing in the athletic event within the sports environment common to both respective sets of one or more than one athlete within the field of views of both the ranging system and the camera produces moving object attribute data associated with the common at least one athlete.

3. The apparatus of claim 2, in which the moving object attribute data associated with said at least one athlete of the respective set of one or more than one athlete of said one or more than one athlete performing in the athletic event within the sports environment comprises at least one of position, speed, direction or velocity data derived from the correlated data associated with said at least one athlete of the respective set of one or more than one athlete of said one or more than one athlete performing in the athletic event within the sports environment using at least one of the ranging data and the camera data for said at least one athlete of the respective set of one or more than one athlete of said one or more than one athlete performing in the athletic event within the sports environment.

4. The apparatus of claim 1, comprising an extractor for extracting, from the camera data, image data associated with said at least one athlete of the respective set of one or more than one athlete of said one or more than one athlete performing in the athletic event within the sports environment.

5. The apparatus of claim 1, comprising a transformation processor for transforming at least one of the ranging data and the camera data into a common reference frame to correlate ranging data and camera of respective corresponding portions of the common volume.

6. The apparatus of claim 5, in which the transformation processor for transforming at least one of the ranging data and the camera data into a common reference frame uses a ranging system reference axis and a camera reference axis that have a predetermined relationship.

7. The apparatus of claim 1, comprising an image processor to extract from the camera data at least one of image or video data associated with said at least one athlete of the respective set of one or more than one athlete of said one or more than one athlete performing in the athletic event within the sports environment.

8. The apparatus of claim 1, comprising circuitry to group ranging data associated with said at least one athlete of the respective set of one or more than one athlete of said one or more than one athlete performing in the athletic event within the sports environment.

9. The apparatus of claim 8, in which the circuitry to group ranging data associated with said at least one athlete of the respective set of one or more than one athlete of said one or more than one athlete performing in the athletic event within the sports environment groups ranging data associated with a series of locations associated with said at least one athlete of the respective set of one or more than one athlete of said one or more than one athlete performing in the athletic event within the sports environment.

10. The apparatus of claim 8, comprising circuitry to coalesce grouped ranging data associated with said at least one athlete of the respective set of one or more than one athlete of said one or more than one athlete performing in the athletic event within the sports environment and to associate that coalesced grouped ranging data with said at least one athlete of the respective set of one or more than one athlete of said one or more than one athlete performing in the athletic event within the sports environment.

11. The apparatus of claim 1, in which the ranging system is a Light Detection And Ranging system arranged to produce Light Detection And Ranging measurement data and the camera data is at least one of image data or video data.

12. The apparatus of claim 1, in which the ranging system being arranged to establish a ground plane for the ranging system comprises establishing a background image for the ranging system.

13. The apparatus of claim 12, in which the ranging system being arranged to establish a ground plane comprises establishing an equation of a plane for the ground plane from the background image.

14. A non-transitory machine-readable storage storing machine executable code arranged, when executed by at least one processor, to track an athlete performing in an athletic event within an area for hosting the event using an apparatus comprising a ranging system, and a camera; the ranging system and the camera bearing respective fields of view, the fields of view being arranged to overlap to survey a common volume, the storing machine executable code comprising instructions:
to establish a ground plane for the ranging system;
to process, using the ground plane, range data relating to a respective set of one or more than one moving object within the common volume and the camera being arranged to produce camera data relating to the respective set of one or more than one moving object within the common volume; the ranging system being arranged to process the range data to distinguish between foreground points and background range data; the foreground points being associated with at least said respective set of one or more than moving object within the common volume;
to process camera video image data relating to a respective set of one or more than one athlete of said one or more moving objects within the area for hosting the event;
to identify data associated with at least one moving object of the respective set of one or more than one moving object common to both sets of one or more than one moving object within the field of views of both the ranging system and the camera, comprising instructions to identify, or correlate, said foreground points and camera video image data associated with a common athlete in both sets of said one or more than one athlete of said one or more than one athlete performing in the athletic event within the sports environment, within the field of views of both the ranging system and the camera;
to determine the identity of the common athlete from said the camera video image data associated with the common athlete; and
to produce athlete attribute data associated with the identity of the common athlete (KPI); the athlete attribute data comprising at least one or more than one of position, spaced, direction or velocity data.

15. An apparatus for tracking an athlete performing in an athletic event within a sports environment, the apparatus comprising:
   a laser ranging system (LIDAR system) and a camera;
   i. the LIDAR system and the camera bearing respective fields of view, the fields of view being arranged to overlap to survey a common volume of the sports environment,
   ii. the LIDAR system is arranged to:
      establish a ground plane associated with the sports environment, and
      produce Light Detection And Ranging (LIDAR) data, using the ground plane, relating to a respective set of one or more than one athlete of said one or more than one athlete performing in the athletic event within the sports environment; the LIDAR system being arranged to process the LIDAR data to distinguish between foreground points and background range data; the foreground points being associated with at least said respective set of one or more than one athlete of said one or more than one athlete performing in the athletic event within the sports environment; and
   iii. the camera being arranged to produce camera data relating to a respective set of one or more than one athlete of said one or more than one athlete performing in the athletic event within the sports environment; and
   a correlator to correlate data associated with a common athlete within the field of views of both the LIDAR system and the camera from the respective sets of said one or more than one athlete of said one or more than one athlete performing in the athletic event within the sports environment; the correlator being arranged:
      to identify, or correlate, said foreground points and camera video image data associated with a common athlete in both sets of said one or more than one athlete of said one or more than one athlete performing in the athletic event within the spoils environment, within the field of views of both the LIDAR system and the camera, and
      to determine the identity of the common athlete from said the camera video image data associated with the common athlete; and to produce athlete attribute data associated with the identity of the common athlete (KPI); the athlete attribute data comprising at least one or more than one of position, speed, direction or velocity data.

16. The apparatus of claim 15, in which the athlete attribute data associated with the common athlete comprises at least one of position, speed, direction or velocity data derived from the correlated data associated with the common athlete using at least one of the LIDAR data and the camera data for the common athlete.

17. The apparatus of claim 15, comprising an extractor for extracting, from the camera data, image data associated with the common athlete.

18. The apparatus of claim 15, in which the ranging system being arranged to establish a ground plane for the ranging system comprises establishing a background image for the ranging system.

19. The apparatus of claim 18, in which the ranging system being arranged to establish a ground plane comprises establishing an equation of a plane for the ground plane from the background image.

* * * * *